(12) United States Patent
Jaber

(10) Patent No.: US 7,761,495 B2
(45) Date of Patent: Jul. 20, 2010

(54) FOURIER TRANSFORM PROCESSOR

(75) Inventor: Marwan Jaber, Montreal (CA)

(73) Assignee: Jaber Associates, L.L.C., Wilmington, DE (US)

( * ) Notice: Subject to any disclaimer, the term of this patent is extended or adjusted under 35 U.S.C. 154(b) by 789 days.

(21) Appl. No.: 11/097,026

(22) Filed: Apr. 1, 2005

(65) Prior Publication Data

US 2005/0278405 A1    Dec. 15, 2005

Related U.S. Application Data

(60) Provisional application No. 60/559,927, filed on Apr. 5, 2004.

(51) Int. Cl.
*G06F 15/00* (2006.01)
(52) U.S. Cl. ..................... 708/403; 708/404
(58) Field of Classification Search .......... 708/400–409
See application file for complete search history.

(56) References Cited

U.S. PATENT DOCUMENTS

| | | | | |
|---|---|---|---|---|
| 6,098,088 | A * | 8/2000 | He et al. | 708/406 |
| 6,401,162 | B1 * | 6/2002 | Nasserbakht | 708/404 |
| 6,963,891 | B1 * | 11/2005 | Hoyle | 708/404 |
| 7,062,522 | B2 * | 6/2006 | Hou | 708/400 |
| 2001/0032227 | A1 * | 10/2001 | Jaber | 708/400 |
| 2001/0051967 | A1 * | 12/2001 | Jaber | 708/403 |
| 2003/0041080 | A1 * | 2/2003 | Jaber | 708/404 |
| 2003/0145026 | A1 * | 7/2003 | Jin | 708/404 |
| 2005/0102342 | A1 * | 5/2005 | Greene | 708/409 |

* cited by examiner

*Primary Examiner*—Chat C Do
(74) *Attorney, Agent, or Firm*—Volpe and Koenig, P.C.

(57) ABSTRACT

The present invention is two-iteration Fourier transform processor for performing Fourier transform of N data inputs into N data outputs. The processor comprises a plurality of two-iteration radix-r modules and a combination phase element. Each radix-r module comprises r radix-r butterflies, a feedback network and a plurality of switches. Each radix-r butterfly comprises r inputs and outputs and a butterfly processing element. The butterfly processing element includes a plurality of multipliers for multiplying the input data and corresponding coefficients and an adder for summing the multiplication outputs from the multipliers. The feedback network feeds outputs of the radix-r butterflies to the corresponding inputs of the radix-r butterfly and the switches selectively pass the input data or the feedback, alternately, to the corresponding radix-r butterfly. The combination phase element includes at least one stage of butterfly computing elements for combining the outputs from the r radix-r butterfly.

9 Claims, 16 Drawing Sheets

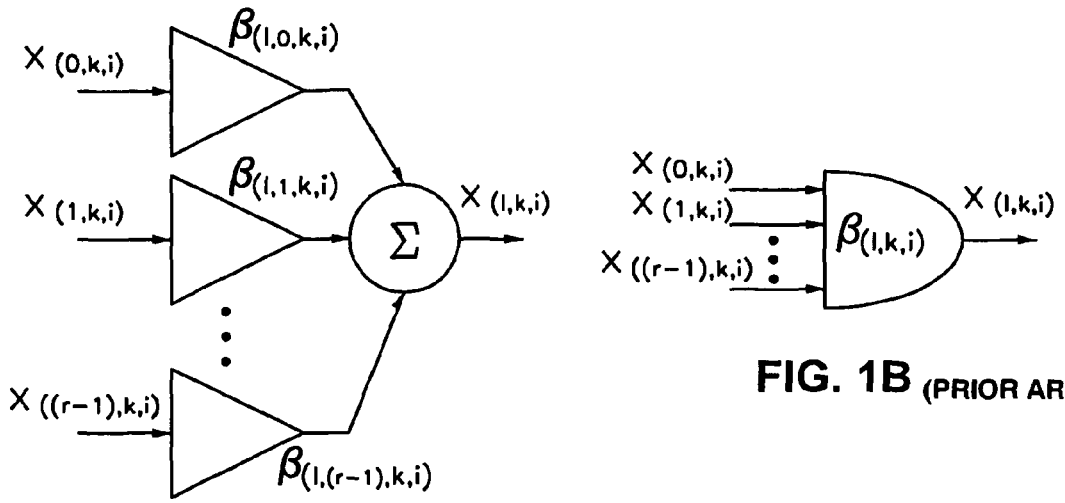
FIG. 1A (PRIOR ART)
FIG. 1B (PRIOR ART)
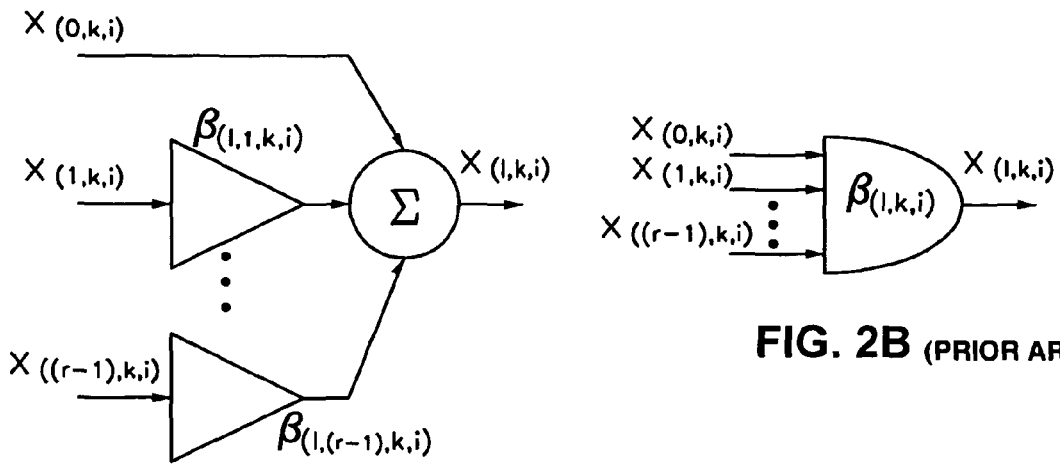
FIG. 2A (PRIOR ART)
FIG. 2B (PRIOR ART)

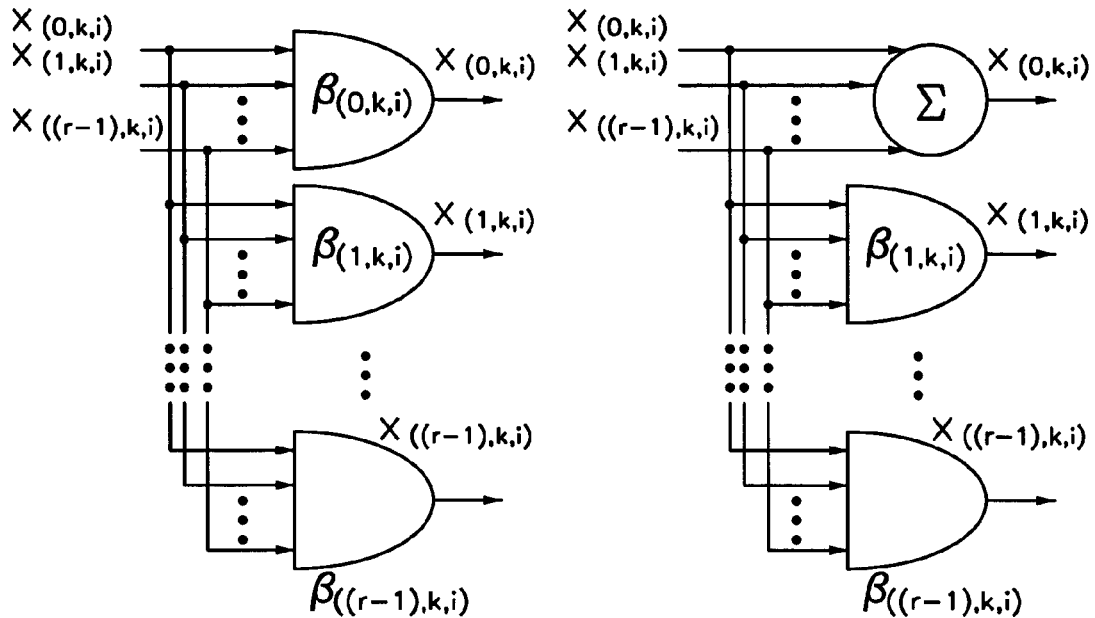
FIG. 3A (PRIOR ART)    FIG. 3B (PRIOR ART)
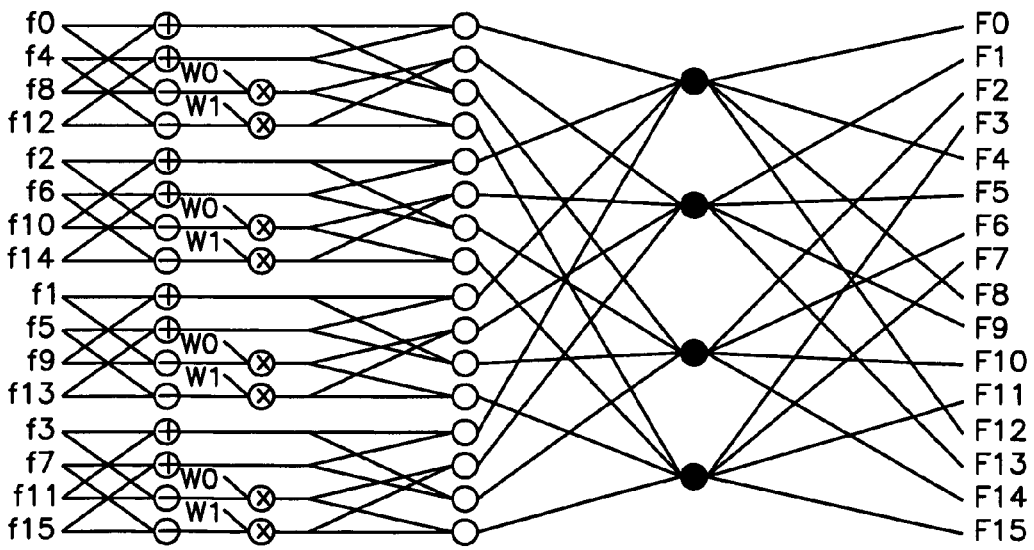
FIG. 4 (PRIOR ART)

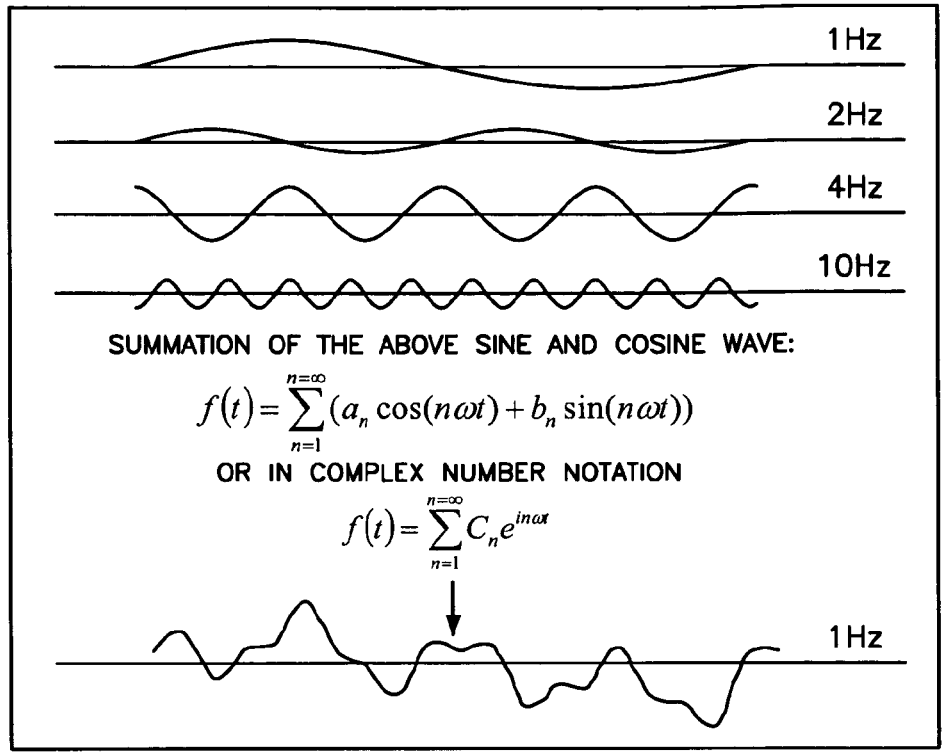
FIG. 19 (PRIOR ART)
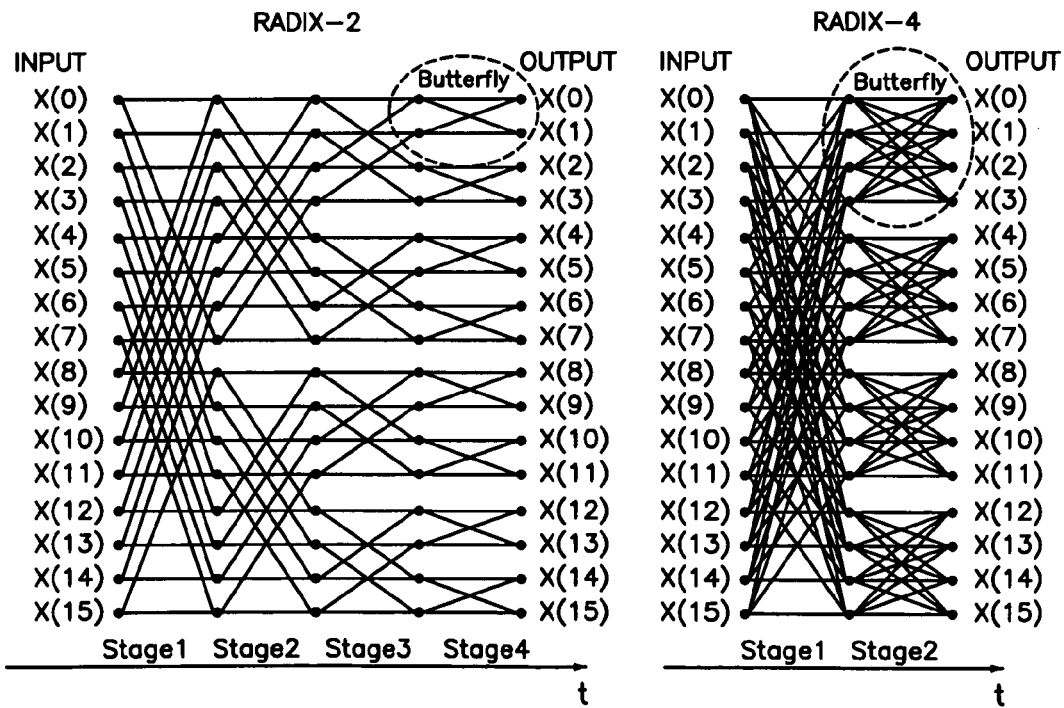
FIG. 20A (PRIOR ART)   FIG. 20B (PRIOR ART)

FOURIER TRANSFORM PROCESSOR

CROSS REFERENCE TO RELATED APPLICATION

This application claims the benefit of U.S. Provisional Application No. 60/559,927, filed Apr. 5, 2004, which is incorporated by reference as if fully set forth.

FIELD OF INVENTION

The present invention is related to Fourier transforms. More particularly, the present invention is two-iteration Fourier transform processor.

BACKGROUND

Despite many new technologies, the Fourier transform remains the workhorse for signal processing analysis in the future. The Discrete Fourier Transform (DFT) is a mathematical procedure that stands at the center of the processing that takes place inside a Digital Signal Processor. Similar to the splitting up of a light beam through a prism, the Fourier transform generates a map of a signal, (i.e., called its spectrum), in terms of the energy amplitude over its various frequency components at regular (e.g. discrete) time intervals known as the signal's sampling rate. This signal spectrum can then be mathematically processed according to the requirements of a specific application such as noise filtering, image enhancement, etc.

When the DFT is applied to samples taken from a complicated and irregular signal, such as that generated by speech in a microphone, the result is a set of sine and cosine coefficients, which represent the amplitude of the signal at given frequencies. When standard sine and cosine waves of appropriate frequencies are multiplied by these coefficients and added back together, the original waveform is exactly reconstructed as shown in FIG. 19. Therefore, a DFT is a decomposition of a sampled signal in terms of sinusoidal, (complex exponential), components.

Because of its large computational requirements, a DFT algorithm, which requires $N^2$ complex multiplications plus a small number of operations to complete a complex addition or subtraction, is typically not used for real time signal processing. Several efficient methods have been developed to compute the DFT, where the symmetry and periodicity properties of the DFT are exploited to significantly lower its computational requirements. These resulting algorithms are known collectively as fast Fourier transforms (FFTs).

The basis of the FFT is that a DFT can be divided into two smaller DFTs, each of which is divided into two smaller DFTs, and so on, resulting in a combination of two points DFTs. In a similar fashion, a radix-4 FFT divides the DFT into four smaller DFTs, each of which is divided into four smaller DFTs, and so on, resulting in a combination of four-points DFTs. FIG. 4 is an example of 16-point FFT radix-2 on four parallel processors combined with four radix four butterflies.

Several methods are used repeatedly to split the DFTs into smaller (two or four-point) core or kernel calculations as shown in FIGS. 20(a) and 20(b).

One "rediscovery" of the FFT, that of Danielson and Lanczos in 1942, provides one of the clearest derivations of the algorithm. Danielson and Lanczos showed that a DFT could be written as the sum of two DFTs each of length N/2. One of the two is formed from the even-numbered points of the original N, the other from the odd-numbered points. The wonderful thing about the Danielson-Lanczos Lemma is that it can be used recursively. Having reduced the problem of computing $X_{(k)}$ to that of computing $X_{e(k)}$ and $X_{o(k)}$, the same reduction of $X_{e(k)}$ can be utilized to the problem of computing the transform of its N/4 even-numbered input data and N/4 odd-numbered data. In other words, $X_{ee(k)}$ and $X_{eo(k)}$ can be defined to be the DFT of the points, which are respectively even-even and even-odd on the successive subdivisions of data. With the restriction on N of being a power of two, it is evident that the Danielson-Lanczos Lemma can be applied until the data are subdivided all the way down to transforms of length 1 in FIG. 21. The Fourier transform of length one is just the identity operation that copies its one input number into its one output slot. Thus, for every pattern of $\log_2 N$ e's and o's, there is a one-point transform that is just one of the input numbers $x_{(n)}$ $X_{eoeeoeo \ldots oee(k)} = x_{(n)}$ for some n.

To figure out which value of n corresponds to which pattern of e's an o's is obtained by reversing the pattern of e's and o's and by letting e=0 and o=1, which give the value of n in binary representation.

For the last decade, the main concern of researchers in this field was to develop an FFT algorithm in which the number of required operations is minimized. Recent findings have shown that the number of multiplications required to compute the DFT of a sequence may be considerably reduced by using one of the FFT algorithms, and interest has arisen both in finding applications for this powerful transform and for considering various FFT software and hardware implementations. As a result, different pre- and post-processing techniques have been developed to further reduce the computational costs when the input sequence is known to satisfy some a priori conditions.

For instance, if the input sequence is real, the DFT may be computed using a half-complex input DFT. One of the bottlenecks in most applications, where high performance is required, is the FFT/IFFT processor. If the $2^n$ or $4^n$ restriction on the transform length is a problem, the solution is to design a radix-r butterfly processing element (PE) comprising butterflies (or engines) with identical structures that could be implemented in parallel in order to reduce the complexity of the PE and to decrease the processing time.

Each of these proposed algorithms has its own characteristic advantages and disadvantages. However, they all have two common problems, which are the communication load and the computational reduction. It is not unusual to find numerous algorithms to complete a given DFT task. Accordingly, finding the best algorithm is a crucial engineering problem for the real time signals' analysis.

It has been shown that the butterfly computation relies on three major parameters: input data, output data and a twiddle factor. In order to control the data flow, numerous architectures for the dedicated FFT processor implementation have been proposed and developed. Some of the more common architectures are described briefly herein. The description is limited to architectures for implementation of the fixed and mixed radix common factor FFT algorithms.

Array Architecture

The array architecture is an isomorphic mapping of the FFT signal flow graph (SFG) with one dedicated processing element for each butterfly in the SFG. This architecture requires $(N/r) \times \log_r N$ processing elements and the area requirements increase quickly with N. Thus, most implementations are limited to N=8 or 16. FIGS. 5 and 6 show examples of the array architecture.

A problem with this architecture, in addition to the high area requirement, is that the input data are sequential and the output data are generated in parallel, leading to a low utilization of the processing elements (PEs). This problem can be overcome by supplying the inputs with N parallel data frames at the same time, skewed one clock cycle with respect to each other. This increases the utilization of the PEs to 100%.

Column Architecture

FIG. 7 is an example of the column architecture. In the column architecture, all the stages in the FFT SFG are collapsed into one column of N/r PEs. Assuming that a PE performs a butterfly operation in one clock cycle, the column of PEs computes one stage of the FFT at each one clock cycle and the entire FFT is computed in $\log_r N$ clock cycles. To simplify the switch network, a constant geometry version of the algorithm has been used in the architecture of FIG. 7. The data shuffling between the stages are identical compared to FIG. 9.

The significant advantage of such an implementation is that the number of PEs is substantially reduced as compared to the array architecture. It has been argued that the area requirement is still high for large N with an increasing complexity in the switching network structure, which is true if implemented on lower radices FFT architecture.

SUMMARY

The present invention is two-iteration Fourier transform processor for performing a Fourier transform of N input data into N output data. The processor comprises a plurality of two-iteration radix-r modules and a combination phase element. Each radix-r module comprises r radix-r butterflies, a feedback network and a plurality of switches. Each radix-r butterfly comprises r inputs and outputs and a butterfly processing element. The butterfly processing element includes a plurality of multipliers for multiplying the input data and corresponding coefficients, and an adder for summing the multiplication outputs from the multipliers. The feedback network is for feeding outputs of the radix-r butterflies to the inputs of the radix-r butterflies having same label, respectively, and the switches selectively pass the input data or the feedback, alternately, to the corresponding radix-r butterfly. The combination phase element includes at least one stage of butterfly computing elements for combining the outputs from the r radix-r butterflies.

BRIEF DESCRIPTION OF THE DRAWINGS

FIG. 1(a) is a diagram of a prior art modified Radix-r DIF Engine and FIG. 1(b) is a diagram of a prior art simplified modified Radix-r DIF Engine.

FIG. 2(a) is a diagram of a prior art modified Radix-r DIT Engine and FIG. 2(b) is a diagram of a prior art simplified modified Radix-r DIT Engine.

FIG. 3(a) is a diagram of a prior art modified Radix-r DIT Module (PE or butterfly) and FIG. 3(b) is a diagram of a prior art simplified modified Radix-r DIF Module (PE or butterfly).

FIG. 4 is a prior art 16 point FFT radix-2 on four parallel processors combined with four radix four butterflies.

FIG. 12 is a diagram of the two inputs switching network that switches on and off by allowing the initial and the feedback inputs to pass through.

FIG. 19 is a prior art illustration of reestablishment of original wave form from complicated waves as a sum of simple sine and cosine waves.

FIGS. 20(a) and 20(b) show typical prior art structures of 16-point FFT algorithm of Radix-2 and Radix-4 cases, respectively.

DETAILED DESCRIPTION OF THE PREFERRED EMBODIMENTS

Figure 5:
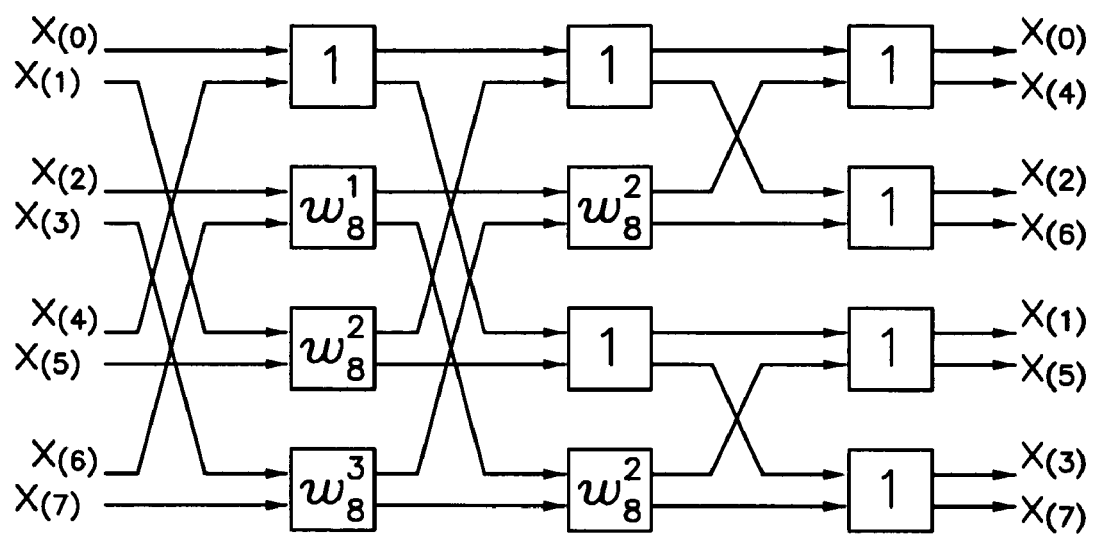
FIG. 5 is a prior art array architecture for an 8-point radix-2 DIF FFT.

The definition of the DFT is shown in Equation (1), where $x_{(n)}$ is the input sequence, $X_{(k)}$ is the output sequence, N is the transform length and $w_N$ is the $N_{th}$ root of unity ($w_N = e^{-j2\pi/N}$). Both $x_{(n)}$ and $X_{(k)}$ are complex valued sequences:

$$X_{(k)} = \sum_{n=0}^{n=N-1} x_{(n)} w_N^{nk}, k \in [0, N-1]. \qquad \text{Equation (1)}$$

The basic operation of a radix-r PE is the so-called butterfly in which r inputs are combined to give the r outputs via the operation:

$$X = B_r \times x; \qquad \text{Equation (2)}$$

where $x = [x_{(0)}, x_{(1)}, \ldots, x_{(r-1)}]^T$ is the input vector and $X = [X_{(0)}, X_{(1)}, \ldots, X_{(r-1)}]^T$ is the output vector. $B_r$ is the r×r butterfly matrix, which can be expressed as:

$$B_r = W_N^r \times T_r; \qquad \text{Equation (3)}$$

for the DIF process, and:

$$B_r = T_r \times W_N^r; \qquad \text{Equation (4)}$$

for the DIT process, where:

$$W_N^r = \text{diag}(1, w_N^p, w_N^{2p}, \ldots, w_N^{(r-1)p}); \qquad \text{Equation (5)}$$

represents the diagonal matrix of the twiddle factor multipliers and $T_r$ is an r×r matrix representing the adder-tree in the butterfly, and where:

$$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)2N/r} \end{bmatrix} = [T_{(l,m)}];$$

Equation (6)

where $$T_{(l,m)} = w^{((l \times m \times (\frac{N}{r})))_N};$$

Equation (7)

and l=m=0, ..., r−1 and $((x))_N$=x modulo N.

As seen from Equations (3) and (4), the adder tree $T_r$ is almost identical for the two algorithms, with the only difference being the order in which the twiddle-factor and the adder tree multiplication is computed.

A straightforward implementation of the adder-tree is not effective for higher radices butterflies, but the adder tree matrix $T_r$ and the elements of the twiddle factor matrix $W_N^r$ both contain twiddle factors. Accordingly, by controlling the variation of the twiddle factor during the calculation of a complete FFT, the twiddle factors and the adder tree matrices can be incorporated into a single stage calculation. This is the basis of the butterfly computation of the present invention, (hereinafter, the Jaber radix-r butterfly structure), that will be described in detail hereinafter Jaber Radix-r Butterfly Structure.

According to Equation (4), $B_r$ is the product of the twiddle factor matrix $W_N^r$ and the adder tree matrix $T_r$. $W_{(r, k, i)}$ is defined as the set of the twiddle factor matrices $W_N^r$ as:

$$W_{(r,k,i)} = \begin{bmatrix} w_{(0,k,i)} & 0 & - & 0 \\ 0 & w_{(1,k,i)} & - & 0 \\ - & & & - \\ 0 & 0 & - & w_{((r-1),k,i)} \end{bmatrix};$$

Equation (8)

in which;

$$w_{(l,m)(k,i)} = w^{((\tilde{N}(\frac{k}{r^i}) \times l \times r^i))_N} \text{ for } l = m, \text{ and}$$

Equation (9)

0 elsewhere.

The modified radix-r butterfly computation Br DIF (Equation 4) can be expressed as:

$$B_{r\_DIF} = W_{(r,k,i)} \times T_r = [B_{r\_DIF(l,m)(k,i)}];$$

Equation (10)

with $$X_{(l)(k,i)} = \sum_{m=0}^{r-1} x_{(m)} w^{((l \times m \times (\frac{N}{r}) + \tilde{N}(\frac{k}{r^i}) \times l \times r^i))_N};$$

Equation (11)

for l=m=0, ..., r−1, i=0, 1, ..., n−1 and k=0, 1, ..., (N/r)−1, where $((x))_N$ denotes x modulo N and $\tilde{N}(k/r^i)$ is defined as the integer part of the division of k by $r^i$.

As a result, the operation of a radix-r PE for the DIF FFT can be formulated as a column vector:

$$X_{(r,k,i)} = B_{r\_DIF} \times x = [X_{(l)(k,i)}];$$

Equation (12)

whose $l^{th}$ element is given by:

$$X_{(l)(k,i)} = \sum_{m=0}^{r-1} x_{(m)} w^{((l \times m \times (\frac{N}{r}) + \tilde{N}(\frac{k}{r^i}) \times l \times r^i))_N}.$$

Equation (13)

With the same reasoning as above, the operation of a radix-r DIT FFT can be derived. In fact, according to Equation (3), $B_r$ is the product of the adder matrix $T_r$ and the twiddle factor matrix $W_N^r$, which is equal to:

$$B_{r\_DIT} = T_r \times W_{(r,k,i)} = [B_{r\_DIT(l,m)(k,i)}];$$

Equation (14)

in which:

$$B_{r\_DIT(l,m)(k,i)} = w^{((l \times m \times (\frac{N}{r}) + \tilde{N}(\frac{k}{r^{(n-i)}}) \times m \times r^{(n-i)}))_N};$$

Equation (15)

and;

$$W_{(r,k,i)} = \begin{bmatrix} w_{(0,k,i)} & 0 & - & 0 \\ 0 & w_{(1,k,i)} & - & 0 \\ - & & & - \\ 0 & 0 & - & w_{((r-1),k,i)} \end{bmatrix}$$

Equation (16)

$$= [w_{(l,m)(k,i)}];$$

where;

$$w_{(l,m)(k,i)} = w^{((\tilde{N}(\frac{k}{r^{(n-i)}}) \times m \times r^{(n-i)}))_N} \text{ for } l = m, \text{ and}$$

Equation (17)

0 elsewhere, and i=0, 1, ..., n and n=($\log_r N$)−1=n−1.

This formulation yields to a pure parallel structure in which the computational load has been distributed evenly on r or r−1 parallel computing units mainly comprising adders and multipliers, and where the delay factor has been totally eliminated from FIGS. 1-3. FIGS. 1(a) and 1(b) are diagrams of a prior art Radix-r DIF engine and simplified DIF engine, respectively; FIGS. 2(a) and 2(b) are diagrams of a prior art Radix-r DIT engine and simplified DIT engine, respectively; and FIGS. 3(a) and 3(b) are diagrams of a prior art DIT module and simplified DIT module, respectively.

The FFT's Parallel Structure.

The representation of the DFT in terms of its partial DFTs has not been mathematically well structured. The problem resides in finding a mathematical model of the combination phase, in which the concept of butterfly computation should be well structured in order to obtain the right mathematical model. The problem is addressed by seeing how $X=T_N x$ (a vector with n component) can be recovered from r vectors that are r times shorter.

DSPs are typically used to accepting large amounts of input data; performing mathematical transformation on that data and then outputting the resulting data, all at very high rates. In a real time system, data flow is important to understand and control in order to achieve high performance. Analyzing the timing characteristics for accessing data and switching between data requestors can maximize bandwidth in a system.

Since the CPU should only be used for sporadic (non-periodic) accesses to individual locations, it is preferable that the data flow should be controlled by an independent device; otherwise the system can incur significant performance degradation. Such peripheral devices, which can control data transfers between an I/O subsystem and a memory subsystem in the same manner that a processor can control such transfers, reduce CP interrupt latencies and leave precious DSP cycles free for other tasks leading to increased performance. Special channels were created, along with circuitry to control them, which allowed the transfer of information without the processor controlling every aspect of the transfer. This circuitry is normally part of the system chipset, (a number of integrated circuits designed to perform one or more related functions), on the DSP board.

Another technique used in the DSP field is known as Bursting mode, which is a rapid data-transfer technique that automatically generates a block of data (i.e. a series of consecutive addresses) every time the processor requests a single address. The assumption is that the next data-address the processor will request will be sequential to the previous one. Bursting can be applied both to read operations (from memory) and write operations (to memory). All the computations of the FFT can be carried out "in place" and, in order to achieve that, the order of the inputs has to be shuffled first. The process is called "bit reversal" because if the sample indexes are written as binary numbers, their index in the FFT input is obtained by reversing the bits. This is also known as a "perfect shuffle".

Table 1 shows bit reversal for N=8 example:

TABLE 1

| Decimal in | Binary in | Binary out | Decimal out |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

Bit reversal can also be carried out "in place" so the FFT is entirely an in-place algorithm.

Accordingly, existing FFT processors rely on the bit reversing techniques, in contrast to the structure of the present invention, which was based on the Jaber Product which gave birth to a chip set known as the Address Generators of the FFT that is described in U.S. patent application Ser. No. 10/140,771 and which is hereby incorporated by reference in its entirety.

Jaber Product ($\hat{*}(\alpha,\gamma,\beta)$)

For a given r×r square matrix $T_r$ and for a given column vector $x_{(n)}$ of size N, the Jaber product expressed with the operator $\hat{*}(\alpha,\gamma,\beta)$, (Jaber product of radix α performed on γ column vector of size β), is defined by the following operation where the γ column vectors are subsets of $x_{(n)}$ picked up at a stride α:

$$X_{(k)} = \hat{*}_{(r,r,N/r)}\left(T_r, \begin{bmatrix} x_{(m)} \\ x_{(m+1)} \\ \vdots \\ x_{(m+(r-1))} \end{bmatrix}\right) \quad \text{Equation (18)}$$

$$= T_r \times \begin{bmatrix} x_{(m)} \\ x_{(m+1)} \\ \vdots \\ x_{(m+(r-1))} \end{bmatrix};$$

$$= \begin{bmatrix} T_{0,0} & T_{0,1} & \cdots & T_{0,(r-1)} \\ T_{1,0} & T_{1,1} & \cdots & T_{1,(r-1)} \\ \vdots & \vdots & \vdots & \vdots \\ T_{(r-1),0} & T_{(r-1),1} & \cdots & T_{(r-1),(r-1)} \end{bmatrix} \times col[x_{(m+j_0)}]; \quad \text{Equation (19)}$$

$$= \left[\sum_{j_0=0}^{r-1} T_{(l,j_0)} x_{(m+j_0)}\right] \quad \text{Equation (20)}$$

for $k = 0, 1, \ldots, \left(\dfrac{N}{r}\right) - 1$
and $l = 0, 1, \ldots, r - 1$;

is a column vector or r column vectors of length (λ×β) where λ is a power of r in which the $l^{th}$ element $Y_l$ of the $k^{th}$ product $Y_{(l,k)}$ is labeled as:

$$l(k) = j_0 \times (\lambda \times \beta) + k; \quad \text{Equation (21)}$$

for k=0, 1, . . . , (λ×β)−1.

Jaber Product Properties

Lemma1

$$X_{(k)} = \hat{*}_{(r,r,\beta)}(T_r,(W_r \times col[x_{(rn+j_0)}])) = \hat{*}_{(r,r,\beta)}(T_r \times W_r, (col[x_{(rn+j_0)}])). \quad \text{Equation (22)}$$

Proof:

$$X_{(k)} = \hat{*}_{(r,r,\beta)}(T_r,(W_r \times col[x_{(m+j_0)}])) \quad \text{Equation (23)}$$

$$= T_r \times (W_r \times col[x_{(m+j_0)}]).$$

$$= (T_r \times W_r) \times col[x_{(m+j_0)}]$$

$$= \hat{*}_{(r,r,\beta)}((T_r \times W_r),(col[x_{(m+j_0)}]))$$

Lemma2

$$X_{(k)} = \hat{*}_{(r_0,r_0,k_0)} \quad \text{Equation (24)}$$

$$\left(T_{r_0}, col \begin{bmatrix} \hat{*}_{(r_1,r_1,k_1)}\left(T_{r_1}, col\left[\sum_{n=0}^{\left(\frac{N}{r_0 r_1}\right)-1} x_{(r_0(r_1 n+j_1))}\right]\right) \\ \vdots \\ \hat{*}_{(r_1,r_1,k_1)}\left(T_{r_1}, col\left[\sum_{n=0}^{\left(\frac{N}{r_0 r_1}\right)-1} x_{(r_0(r_1 n+j_1)+(r_0-1))}\right]\right) \end{bmatrix}\right)$$

$$= \hat{*}_{(r_0,r_0,k_0)}$$

-continued $$\left(T_{r_0}, col\left[\hat{*}_{(r_1, r_0 r_1, k_1)}\left(\left[\sum_{n=0}^{\left(\frac{N}{r_0 r_1}\right)-1} x_{(r_0(r_1 n + j_1) + j_0)}\right]\right)\right]\right).$$

DFT Factorization

Based on the proposition in the previous section, Equation (1) can be rewritten as:

$$X_{(k)} = \sum_{n=0}^{N-1} x_{(n)} w_N^{kn} \quad \text{Equation (25)}$$

$$= \hat{*}(r, r, N/r)$$

$$\left(T_r, \begin{bmatrix} \sum_{n=0}^{(N/r)-1} x_{(m)} w_N^{mk_0} \\ \sum_{n=0}^{(N/r)-1} x_{(m+1)} w_N^{(m+1)k_0} \\ \vdots \\ \sum_{n=0}^{(N/r)-1} x_{(m+(r-1))} w_N^{(m+(r-1))k_0} \end{bmatrix}\right);$$

for $k_0 = 0, 1, \ldots, (N/r)-1$, and $n = 0, 1, \ldots, N-1$. Since:

$$w_N^{rnk} = w_{N/r}^{nk}. \quad \text{Equation (26)}$$

Equation (25) becomes:

$$X_{(k)} = \hat{*}(r, r, N/r)\left(T_r, \begin{bmatrix} \sum_{n=0}^{(N/r)-1} x_{(m)} w_{N/r}^{nk_0} \\ w_N^{k_0} \sum_{n=0}^{(N/r)-1} x_{(m+1)} w_{N/r}^{nk_0} \\ \vdots \\ w_N^{(r-1)k_0} \sum_{n=0}^{(N/r)-1} x_{(m+(r-1))} w_{N/r}^{nk_0} \end{bmatrix}\right); \quad \text{Equation (27)}$$

which for simplicity may be expressed as:

$$X_{(k)} = \hat{*}(r, r, N/r)\left(T_r \times [w_N^{j_0 k_1}], col\left[\sum_{n=0}^{(N/r)-1} x_{(m+j_0)} w_{N/r}^{nk_0}\right]\right); \quad \text{Equation (28)}$$

where for simplification in notation the column vector in Equation (28) is set equal to:

$$\begin{bmatrix} \sum_{n=0}^{(N/r)-1} x_{(m)} w_{N/r}^{nk_0} \\ w_N^{k_0} \sum_{n=0}^{(N/r)-1} x_{(m+1)} w_{N/r}^{nk_0} \\ \vdots \\ w_N^{(r-1)k_0} \sum_{n=0}^{(N/r)-1} x_{(m+(r-1))} w_{N/r}^{nk_0} \end{bmatrix} = col\left[\sum_{n=0}^{(N/r)-1} x_{(m+j_0)} w_{N/r}^{nk_0}\right]; \quad \text{Equation (29)}$$

for $j_0 = 0, \ldots, (r-1)$, $k_0 = 0, 1, \ldots, (N/r)-1$ and $[w_N^{j_0 k_0}] = \text{diag}(w_N^0, w_N^{k_0}, \ldots, w_N^{(r-1)k_0})$.

If $X_{(k)} = \sum_{n=0}^{N-1} x_{(n)} w_N^{nk}$ represents the DFT of a sequence of length N;

$$X_{0_{(k)}} = \sum_{n=0}^{(N/r)-1} x_m w_{N/r}^{nk}, \quad X_{1_{(k)}} = \sum_{n=0}^{(N/r)-1} x_{m+1} w_{N/r}^{nk}, \ldots, \text{ and;}$$

$$X_{(r-1)_{(k)}} = \sum_{n=0}^{(N/r)-1} x_{m+(r-1)} w_{N/r}^{nk};$$

represent the DFT of sequences of length N/r. As a result, Equation (28) can be expressed as:

$$X_{(k)} = \hat{*}(r, r, N/r)\left(T_r, \begin{bmatrix} w^0 X_{0_{(k)}} \\ w_N^k X_{1_{(k)}} \\ \vdots \\ w_N^{(r-1)k} X_{(r-1)_{(k)}} \end{bmatrix}\right) \quad \text{Equation (30)}$$

$$= \hat{*}(r, r, N/r)\left(T_r, col[w_N^{j_0 k} X_{j_{0(k)}}]\right);$$

for $j_0 = 0, 1, \ldots, r-1$.

Finally, Equation (30) can be developed according to the definition of Jaber product to yield the following expression:

$$X_{(k)} = \quad \text{Equation (31)}$$

$$\begin{bmatrix} w^0 X_{0_{(k)}} + w^{0+k} X_{1_{(k)}} + \ldots + w^{0+(r-1)k} X_{(r-1)_{(k)}} \\ w^0 X_{0_{(k)}} + w^{N/r+k} X_{1_{(k)}} + \ldots + w^{(r-1)N/r+(r-1)k} X_{(r-1)_{(k)}} \\ \vdots \\ w^0 X_{0_{(k)}} + \ldots + w^{(r-1)^2 N/r+(r-1)k} X_{(r-1)_{(k)}} \end{bmatrix};$$

for $k = 0, 1, \ldots, \beta-1$, which represents the generalized radix-r butterfly computation.

Due to the fact that:

$$X_{(k)} = \hat{*}(r, r, N/r) \left( T_r, \left[ \begin{bmatrix} w_N^0 & 0 & - & 0 \\ 0 & w_N^k & - & 0 \\ - & - & - & - \\ 0 & 0 & - & w_N^{(r-1)k} \end{bmatrix} \times \begin{bmatrix} X_{0_{(k)}} \\ X_{1_{(k)}} \\ - \\ X_{(r-1)_{(k)}} \end{bmatrix} \right] \right);$$

Equation (32)

$$X_{(k)} = \hat{*}(r, r, N/r) \left( [T_r \times W_{(k)}], col\left[X_{j_{0_{(k)}}}\right] \right);$$

Equation (33)

where $W_{(k)} = [w_{(l,j_0)}]$; Equation (34)

in which $w_{(l,j_0)} = w^{(j_0 k))_N}$; Equation (35)

for $l=j_0$ and 0 elsewhere. Equation (24) in the case where $X_{pj_{0(k)}}$ represents the partial DIF or DIT DFT of the sequence $$\sum_{n=0}^{(N/r)-1} x_{(rn+j_0)} w_{N/r}^{nk}$$

may be expressed by:

$$X_{(k)} = \hat{*}(r, r, N/r) \left( [B_{r(Combination)}], col\left[X_{j_{0_{(k)}}}\right] \right);$$

Equation (36)

where $X_{j_{0(k)}}$ represents the partial DIT or DIF DFT of the sequence $$\sum_{n=0}^{(N/r)-1} x_{(rn+j_0)} w_{N/r}^{nk}.$$

Further simplification results when the $l_{th}$ transform of the $k_{th}$ word is represented by:

$$X_{l_{(k)}} = \sum_{j_1=0}^{r-1} X_{j_{0_{(k)}}} w_N^{((lj_0 N/r + j_0 k))_N};$$

Equation (37)

for $l=0, 1, \ldots, r-1, k=0, 1, \ldots, \beta-1$, where $((x))_N$ denotes x modulo N.

A two iteration (cycle) FFT in accordance with the present invention is described hereinafter. The amount of communication and the computational load in an FFT process relies on two parameters, the radix r and the number of iterations n, where the sampled data of length $N=r^n$. It has been shown that the use of higher radices reduces the amount of multiplications and the number of stages that represents the amount of global communication. It is clearly evident that the optimal solution to minimize the workload of an FFT process is achieved when n=2. If $N=r^M$, as in the example of FIGS. 20 (a) and (b), then the decomposition process is carried out to M levels, so that there are $M=\log_2 N$ stages as shown in FIGS. 20(a) and 20(b) (4 stages for the radix 2 case in FIG. 20(a) and 2 stages for the radix 4 case in FIG. 20(b)), each implemented using N/r butterflies.

Figure 6:
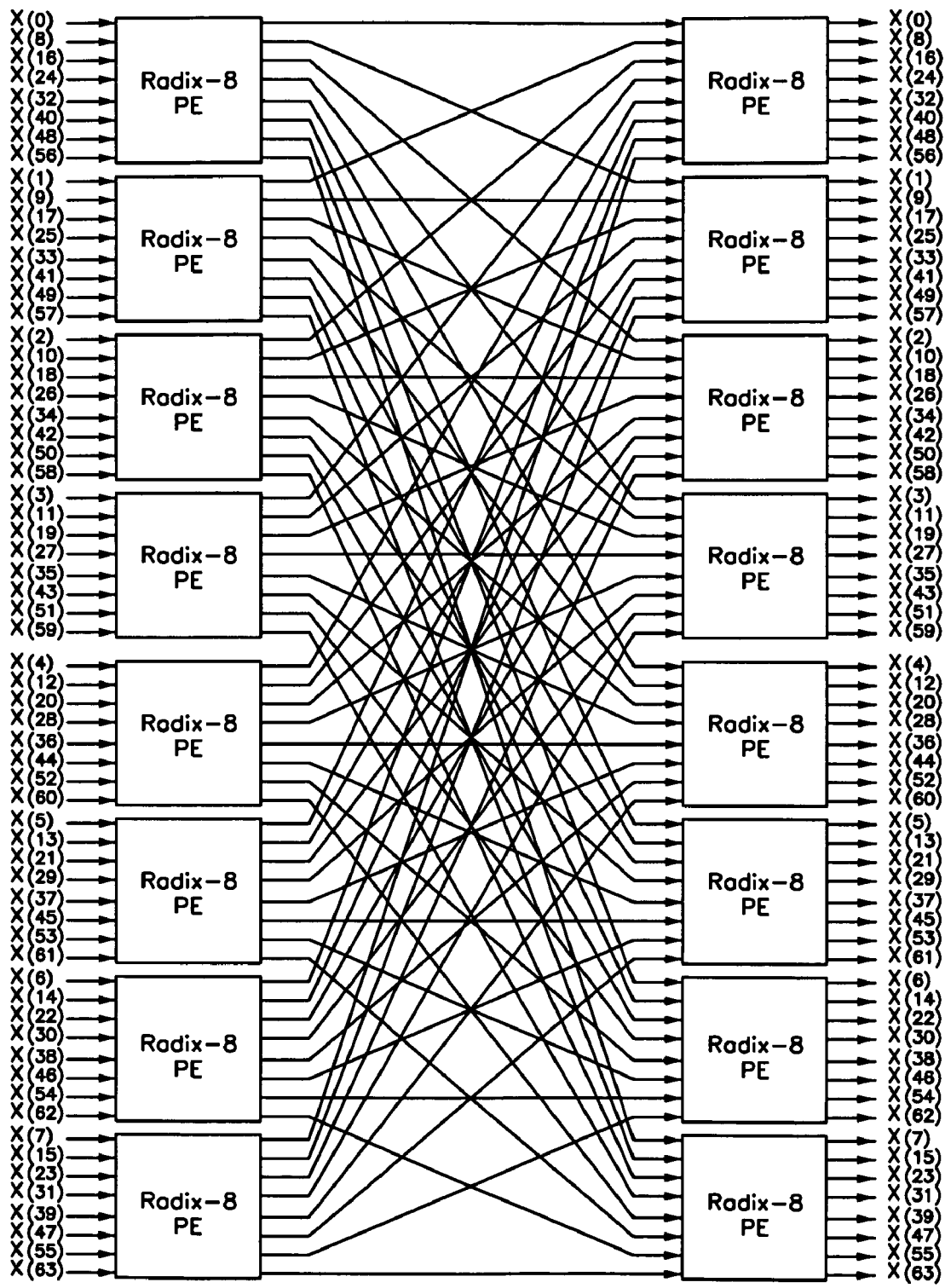
FIG. 6 is a prior art array architecture for a 64-point radix-8 FFT.
Figure 7:
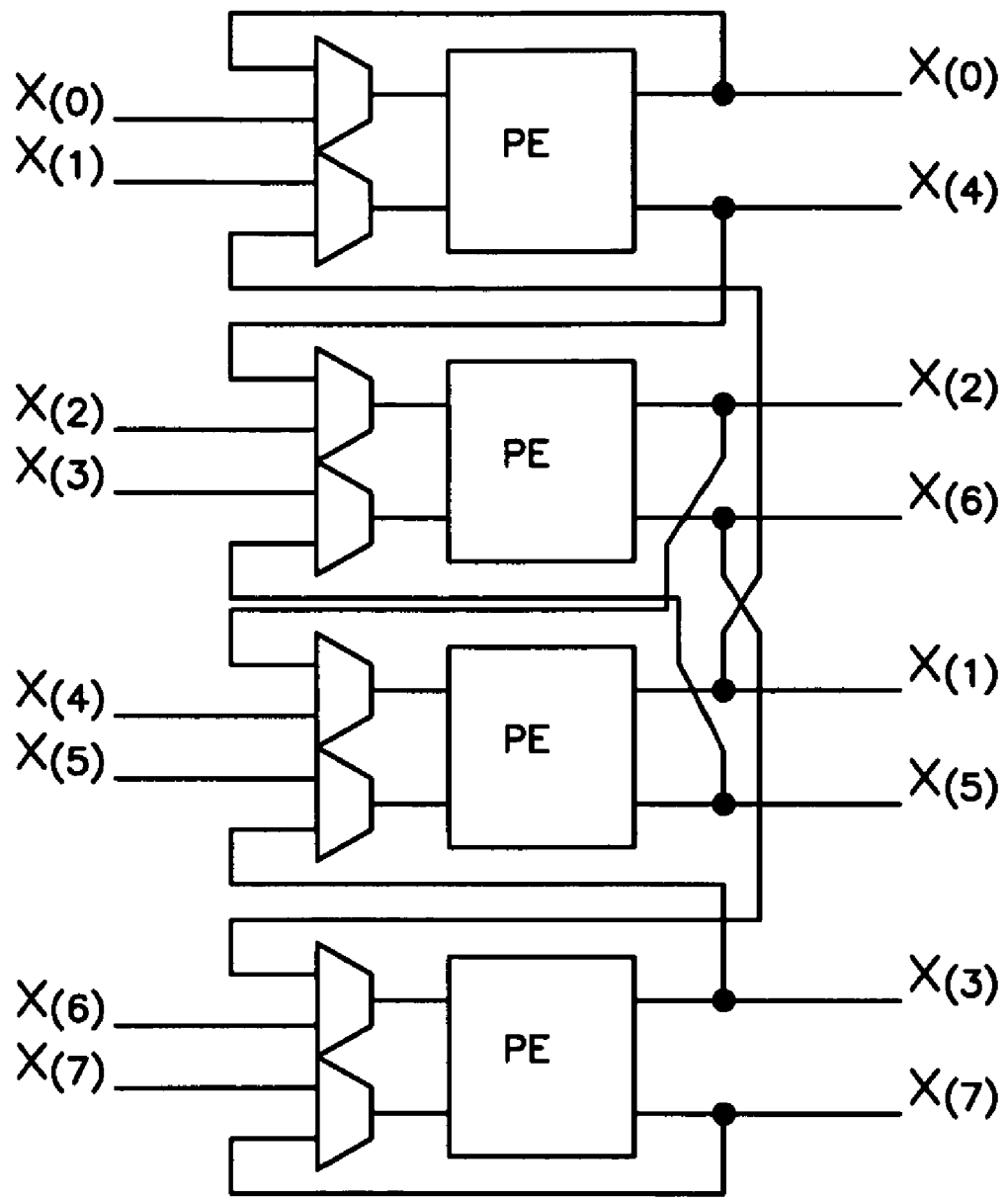
FIG. 7 is a prior art column architecture for 8-point radix-2 FFT.

In the DIT and DIF reading/writing address generator in a two-iteration FFT, the processed data is stored at the same address location from which it has been retrieved. Accordingly, the global amount of memory usage in an FFT is minimized if implemented on a single processor environment. Such type of FFT would be of great interest in the array architecture as shown in FIG. 6, in which the number of required processing element butterfly is 16 instead of 192 in the radix-2 case and 64 for the radix-4 case. Furthermore, as shown the communication load and its complexity have been reduced drastically in comparison with the above-mentioned radices.

The $r^2$ (Two Iteration) Kernel Structure.

In this embodiment of the present invention, instead of factoring the DFT up to a radix-r core computation, it is factored into transforms of sizes $r^2$ in each of which r radix-r butterflies comprise the core of the kernel. In order to achieve this factorization, two cases should be treated separately when n is odd or even where $n=\log_r N$. In fact, for data of size $N=r^n=r_1 \times r_2 \times \ldots \times r_i \times r^2$, so, the DFT is factored into $r_1 \times r_2 \times \ldots \times r_i$ partial DFTs, each of which contains a transform of size $r^2$ core computation in which r radix-r butterfly comprises the core of the kernel.

Factorization of the DFT into $r^2$ Kernel Computation:

$$X_{(k)} = \sum_{n=0}^{N-1} x_{(n)} w_N^{kn}$$

Equation (38)

$$= \hat{*}_{(r_0, r_0, N/r_0)} \left( T_{r_0}, \left[ \begin{array}{c} \sum_{n=0}^{(N/r_0)-1} x_{(r_0 n)} w_N^{r_0 n k_0} \\ \sum_{n=0}^{(N/r_0)-1} x_{(r_0 n+1)} w_N^{(r_0 n+1)k_0} \\ \vdots \\ \sum_{n=0}^{(N/r_0)-1} x_{(r_0 n+(r_0-1))} w_N^{(r_0 n+(r_0-1))k_0} \end{array} \right] \right);$$

$$= \hat{*}_{(r_0, r_0, N/r_0)} \left( T_{r_0}, \left[ \begin{array}{c} w_N^0 \sum_{n=0}^{(\frac{N}{r_0})-1} x_{(r_0 n)} w_N^{(r_0 n)k_0} \\ \vdots \\ w_N^{(r_0-1)k_0} \sum_{n=0}^{(\frac{N}{r_0})-1} x_{(r_0 n+(r_0-1))} w_N^{(r_0 n)k_0} \end{array} \right] \right);$$

Equation (39)

-continued $$= \hat{*}_{(r_0, r_0, N/r_0)} \left( T_{r_0}, col\left[ w_N^{j_0 k_0} \sum_{n=0}^{(\frac{N}{r_0})-1} x_{(r_0 n + j_0)} w_{N/r_0}^{n k_0} \right] \right);$$

Equation (40)

for $j_0 = 0, 1, \ldots, r_1-1$ and $k_0 = 0, 1, \ldots, (N/r_0)$;

$$= \hat{*}_{(r_0, r_0, k_0)} \left( T_{r_0}, col\left[ \begin{bmatrix} w_N^0 & 0 & \cdots & 0 \\ 0 & w_N^{k_0} & 0 & 0 \\ \vdots & \vdots & \vdots & \vdots \\ 0 & \cdots & \cdots & w_N^{(r_0-1)k_0} \end{bmatrix} \times \left[ \sum_{n=0}^{k_0-1} x_{(r_0 n + j_0)} w_{N/r_0}^{n k_0} \right] \right] \right);$$

Equation (41)

$$= \hat{*}_{(r_0, r_0, k_0)} \left( T_{r_0} \times W_{N_{(k_0)}}^0, \left[ \sum_{n=0}^{k_0-1} x_{(r_0 n + j_0)} w_{N/r_0}^{n k_0} \right] \right);$$

Equation (42)

where:

$$W_{N_{(k_0)}}^0 = \begin{bmatrix} w_N^0 & 0 & \cdots & 0 \\ 0 & w_N^{k_0} & 0 & 0 \\ \vdots & \vdots & \vdots & \vdots \\ 0 & \cdots & \cdots & w_N^{(r_0-1)k_0} \end{bmatrix} = diag[w_N^{j_0 k_0}];$$

Equation (43)

for $j_0 = 0, 1, \ldots, r_0-1$, and $k_0 = 0, 1, \ldots, (N/r_0)$.

By defining:

$$B_{r_0} = T_{r_0} \times W_{N_{(k_0)}}^0;$$

Equation (44)

Equation 39 is represented as follows:

$$X_{(k)} = \hat{*}_{(r_0, r_0, k_0)} \left( B_{r_0}, \left[ \sum_{n=0}^{k_0-1} x_{(r_0 n + j_0)} w_{N/r_0}^{n k_0} \right] \right).$$

Equation (45)

Further factorization yields:

$$X_{(k)} = \hat{*}_{(r_0, r_0, k_0)} \begin{pmatrix} \begin{bmatrix} \hat{*}_{(r_1, r_1, k_1)} \\ \begin{pmatrix} B_{r_1}, col \\ \begin{bmatrix} \left(\frac{N}{r_0 r_1}\right)-1 \\ \sum_{n=0}^{} x_{(r_0 (r_1 n + j_1))} w_{N/r_0 r_1}^{n k_1} \end{bmatrix} \end{pmatrix} \\ \vdots \\ \hat{*}_{(r_1, r_1, k_1)} \\ \begin{pmatrix} B_{r_1}, col \\ \begin{bmatrix} \left(\frac{N}{r_0 r_1}\right)-1 \\ \sum_{n=0}^{} x_{(r_0 (r_1 n + j_1) + (r_0-1))} w_{N/r_0 r_1}^{n k_1} \end{bmatrix} \end{pmatrix} \end{bmatrix} \end{pmatrix};$$

Equation (46)

for $j_0 = 0, 1, \ldots, r_0-1, j_1 = 0, 1, \ldots, r_1-1, k_0 = 0, 1, \ldots, (N/r_0)$, $k_1 = 0, 1, \ldots, (N/r_0 r_1)$ and where:

$$B_{r_1} = T_{r_1} \times W_{(N/r_0)(k_1)}^1;$$

Equation (47)

and;

$$W_{(N/r_0)(k_1)}^1 = \begin{bmatrix} w_{N/r_0}^0 & 0 & \cdots & 0 \\ 0 & w_{N/r_0}^{k_1} & \cdots & \cdots \\ \vdots & \vdots & \vdots & \vdots \\ 0 & 0 & \cdots & w_{N/r_0}^{(r_1-1)k_1} \end{bmatrix}$$

$$= \begin{bmatrix} w_N^0 & 0 & \cdots & 0 \\ 0 & w_N^{r_0 k_1} & \cdots & \cdots \\ \vdots & \vdots & \vdots & \vdots \\ 0 & 0 & \cdots & w_N^{r_0(r_1-1)k_1} \end{bmatrix}$$

$$= diag[w_N^{r_0 j_1 k_1}];$$

Equation (48)

which for simplicity is expressed as follow:

$$X_{(k)} = \hat{*}_{(r_0, r_0, k_0)} \left( B_{r_0}, col\left[ \hat{*}_{(r_1, r_0 r_1, k_1)} \left( B_{r_1}, col\left[ \sum_{n=0}^{k_1-1} x_{(r_0(r_1 n + j_1) + j_0)} w_{N/r_0 r_1}^{n k_1} \right] \right) \right] \right);$$

Equation (49)

for $j_0 = 0, 1, \ldots, r_0-1, j_1 = 0, 1, \ldots, r_1-1, k_0 = 0, 1, \ldots, (N/r_0)$, $k_1 = 0, 1, \ldots, (N/r_0 r_1)$ and N is a multiple of $r_0 r_1$.

Therefore, $X(k)$ is expressed in terms of the $i^{th}$ decomposition as:

$$X_{(k)} = \hat{z}\left(r_p, \prod_{\substack{s=0 \\ p=0}}^{p}{}^i r_s, k_p\right)$$

Equation (50)

$$\left(B_{r_p}, col\left[\sum_{n=0}^{k_p-1} x_{\left((\prod_{s=0}^{p} r_s)\times n + \sum_{k=1}^{p>0}(\prod_{s=1}^{k} r_{(s-1)})\times j_k + j_0\right)} w_N^{nk_p}/(\prod_{s=0}^{p} r_s)\right]\right);$$

where: $B_{r_p} = T_{r_p} \times W_N^p$; and;

Equation (51)

$$W_N^p = \begin{bmatrix} w_N^0 & 0 & \cdots & 0 \\ 0 & w_N^{(\prod_{s=0}^{p-1} r_s)\times k_p} & \cdots & 0 \\ \vdots & \vdots & \vdots & \vdots \\ 0 & 0 & \cdots & w_N^{(\prod_{s=0}^{p-1} r_s)\times (r_p-1)\times k_p} \end{bmatrix}$$

Equation (52)

$$= diag\left[w_n^{(\prod_{s=0}^{p-1} r_s)\times j_p \times k_p}\right] \text{ for } p > 0;$$

for $j_p = 0, 1, \ldots, r_p - 1$, $$k_p = \frac{N}{\prod_{s=0}^{p} r_s}$$

and $W_N^0$ is given in Equation 40.

In DSP layman's language, the factorization of an FFT can be interpreted as dataflow diagram (or SFG), which depicts the arithmetic operations and their dependencies. It should be noted that if the dataflow diagram is read from left to right the decimation in frequency algorithm is obtained and λ in Equation (22) is equal to $r^{(-1)}$, meanwhile if the dataflow diagram is read from right to left the decimation in time algorithm is obtained and λ in Equation (21) is equal to r.

When $k_p = r^2$, the two iterations' kernel computation is obtained and from these partial DFTs the FFT is reconstructed.

Figure 10:
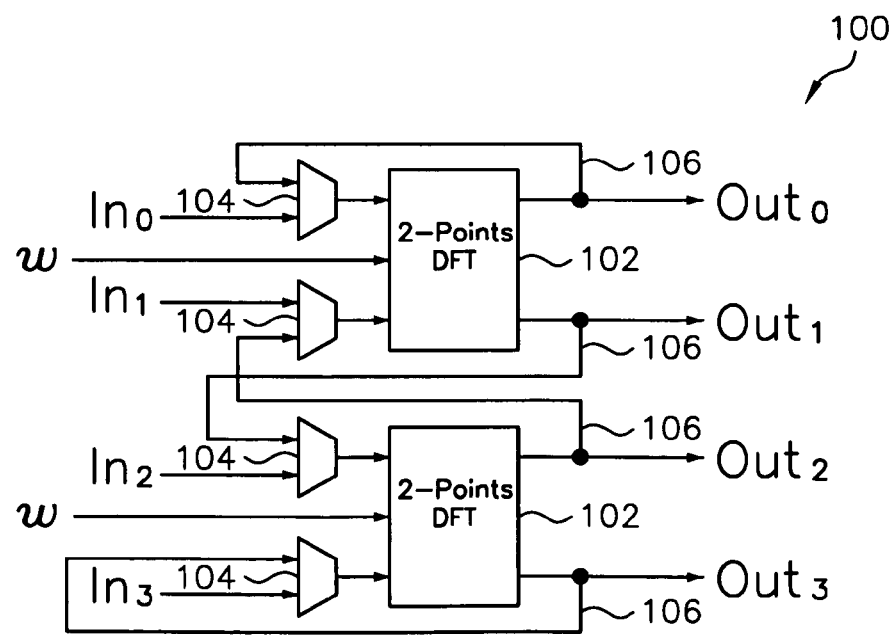
FIG. 10 is a diagram of one embodiment of a two iterations radix-2 kernel computation module in accordance with the present invention.
Figure 11:
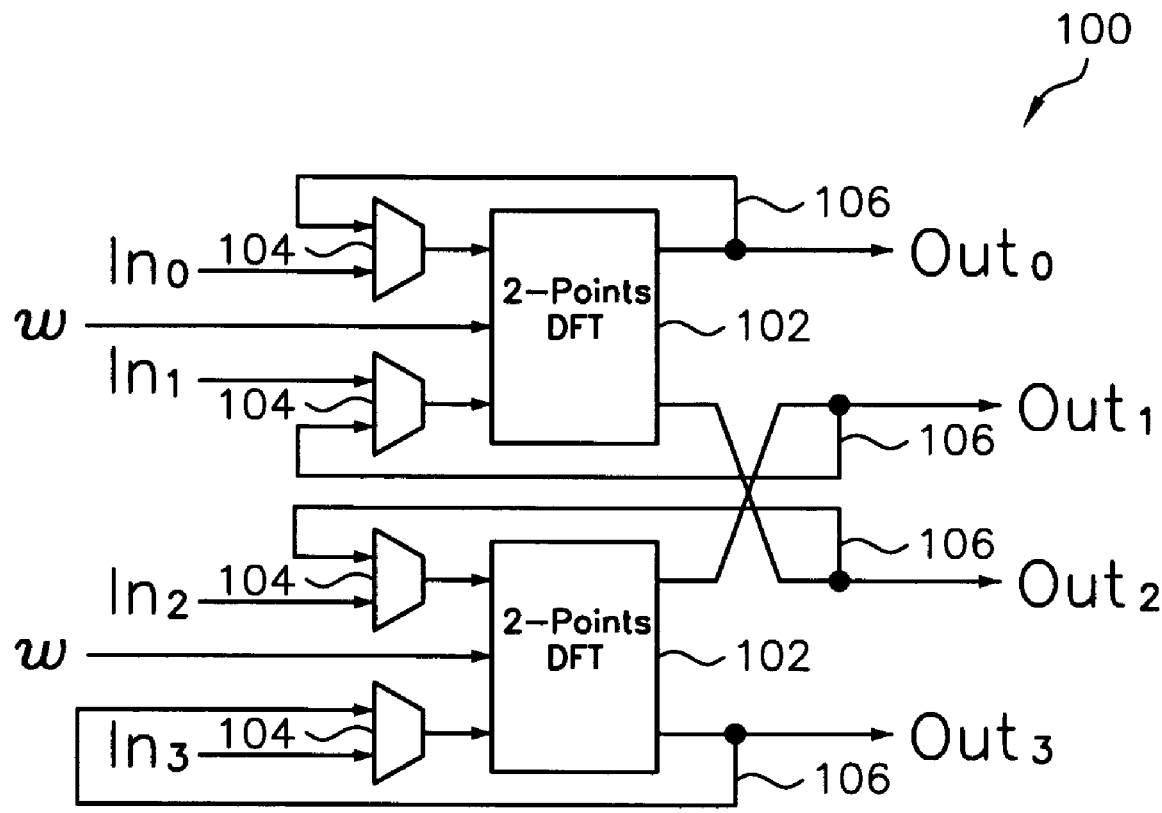
FIG. 11 is a diagram of another embodiment of the two iterations radix-2 kernel computation module in accordance with the present invention.

As an example, the radix $2^2$ case is explained hereinafter. The same logic may be extended to the $r^2$ case. As stated previously, the DFT factorization yields to $$a\prod_{p=0}^{i} r_p$$

transform of length $r^2$, referred as the two iteration kernel, or core computation. Two different structures are proposed by the present invention as illustrated in FIGS. 10 and 11. FIG. 10 is a diagram of one embodiment of a two-iteration radix-2 kernel computation module in accordance with the present invention, and FIG. 11 is an alternative embodiment of the same. The difference between FIGS. 10 and 11 is that in FIG. 11 the output data are arranged in a normal order, while in FIG. 10 a shuffling phase is required in order to rearrange the data into normal order.

The two-iteration radix-2 module 100 comprises two (2) radix-2 butterflies 102, four switches 104 and feedback networks 106. Each radix-2 butterfly 102 includes a plurality of multipliers for multiplying the input data and corresponding coefficients and an adder for adding the multiplication results. The radix-2 butterfly output is fedback to an input through a switch 104.

Figure 12:
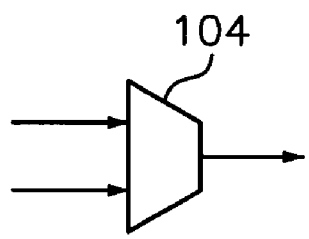

The switch 104 illustrated in FIG. 12 acts as an on and off switch, which at the first stage acts as an on circuit by allowing the labeled input to pass through and, as soon as the labeled input passes through, it turns off by allowing the feedback input to pass through.

The outputs of radix-2 butterflies 102 are feedback in a way that the "same labeled" output of each block enters the inputs of the "same labeled" butterfly 102. For example, in FIG. 10, $OUT_0$ is feedback to $0_{th}$ input, and $OUT_2$ is feedback to $2_{th}$ input, and so on.

For transforms whose sizes are greater than $r^2$, a block building of these modules are performed. For instance, the $i^{th}$ stage contains $$\prod_{p=0}^{i} r_p$$

transform, each of which contains $r_i$ transform of size $r^2$. The $r_i$ transform of size $r^2$ of each $$\prod_{p=0}^{i} r_p$$

transform is combined with $r_i$ labeled butterflies $(0, 1, r_i-1)$ of radix $r_i$ by feeding the $r_i$ labeled $Out_0$ to the input of the 0 labeled butterfly's input and so on. The values of the w's inputs are provided by Equations 40 and 49.

Array of Column Architecture.

Suppose that during the process of the DFT factorization that $r_1 = r_2 = \ldots = r_i = r = 2$, therefore, the DFT factorization of an eight points data size is given by:

Equation (53)

$$X_{(k)} = \hat{z}\left(r_p, \prod_{s=0}^{p} r_s, k_p\right)_{p=0}^{i}$$

$$\left(B_{r_p}, col\left[\sum_{n=0}^{k_p-1} x_{\left((\prod_{s=0}^{p} r_s)\times n + \sum_{k=1}^{p>0}(\prod_{s=1}^{k} r_{(s-1)})\times j_k + j_0\right)} w_N^{nk_p} / (\prod_{s=0}^{p} r_s)\right]\right);$$

$$= \hat{z}_{(2,2,4)}\left(B_2, col\left[\sum_{n=0}^{3} x_{(2n+j_0)} w_{N/2}^{nk}\right]\right);$$

for $j_0=0, 1, k_1=0, 1, 2, 3$ and where $$B_2 = T_2 W_N^0;$$

Equation (54)

and;

$$W_N^0 = \begin{bmatrix} 1 & 1 \\ 1 & w^k \end{bmatrix}.$$

Equation (55)

Figure 13:
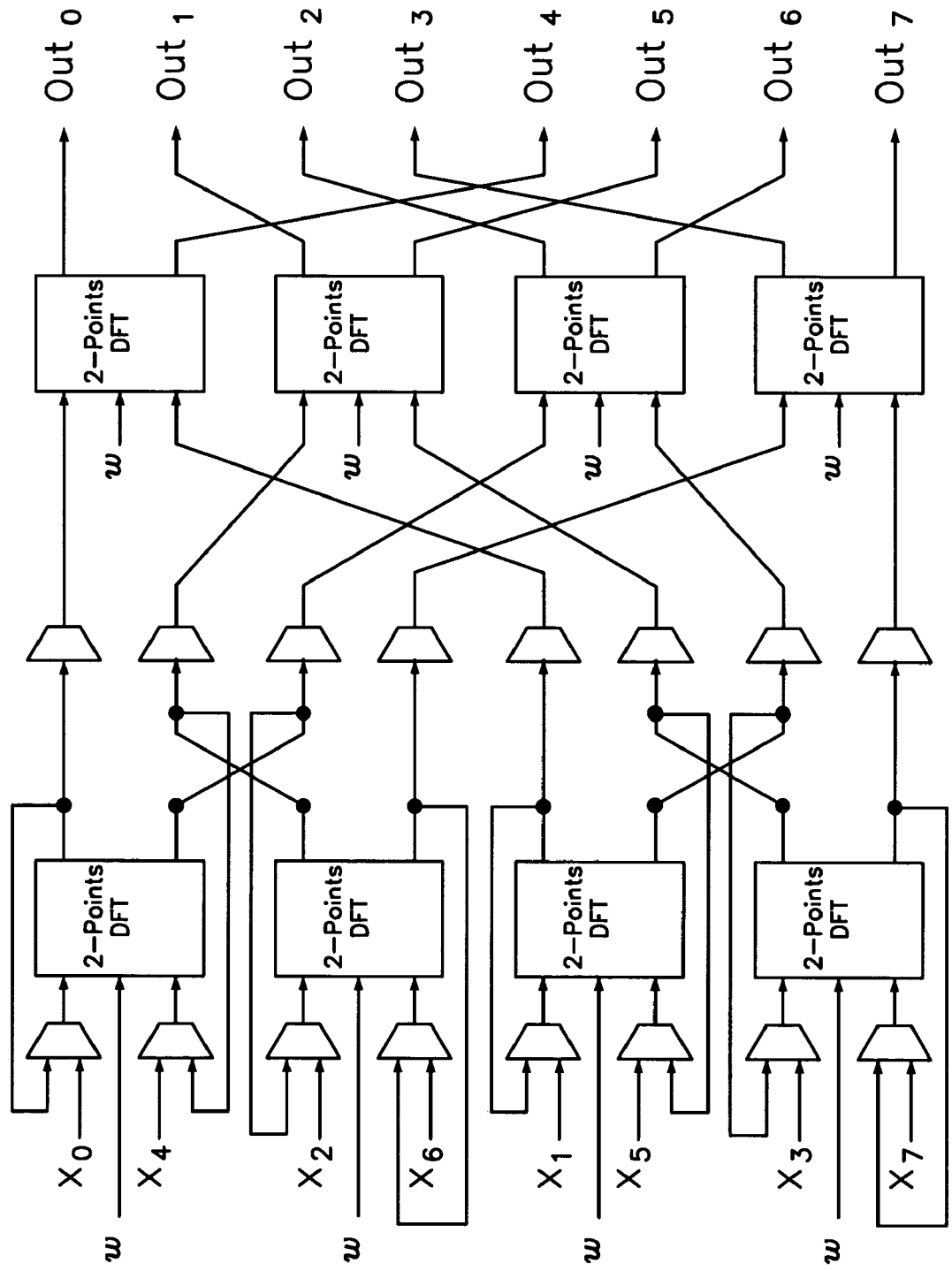
FIG. 13 is a diagram of an 8-point FFT in array of column architecture in accordance with the present invention.
Figure 14:
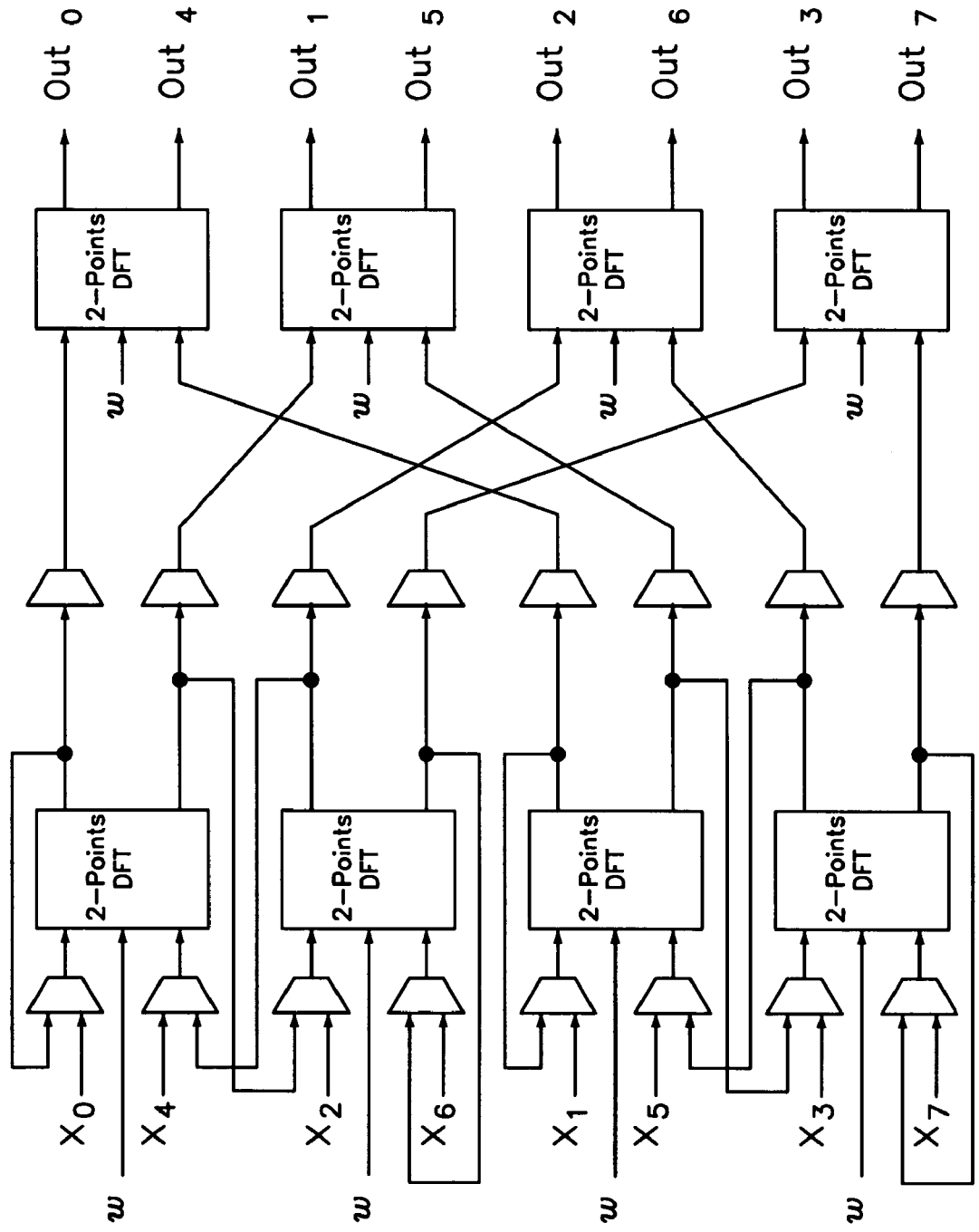
FIG. 14 is a diagram of an alternative embodiment of implementing the SFG of an 8-point FFT in array of column architecture in accordance with the present invention.

The resulting SFG is illustrated in FIGS. 13 and 14, in which the size of the circuits is reduced in comparison with the array architecture of FIG. 5. FIG. 13 is a diagram of an 8-point FFT in array of column architecture in accordance with the present invention, and FIG. 14 is an alternative for the same. Two (2) two-iteration FFT modules in FIGS. 10 and 11 are duplicated to generate a 8-point FFT of FIGS. 13 and 14, respectively.

Figure 15:
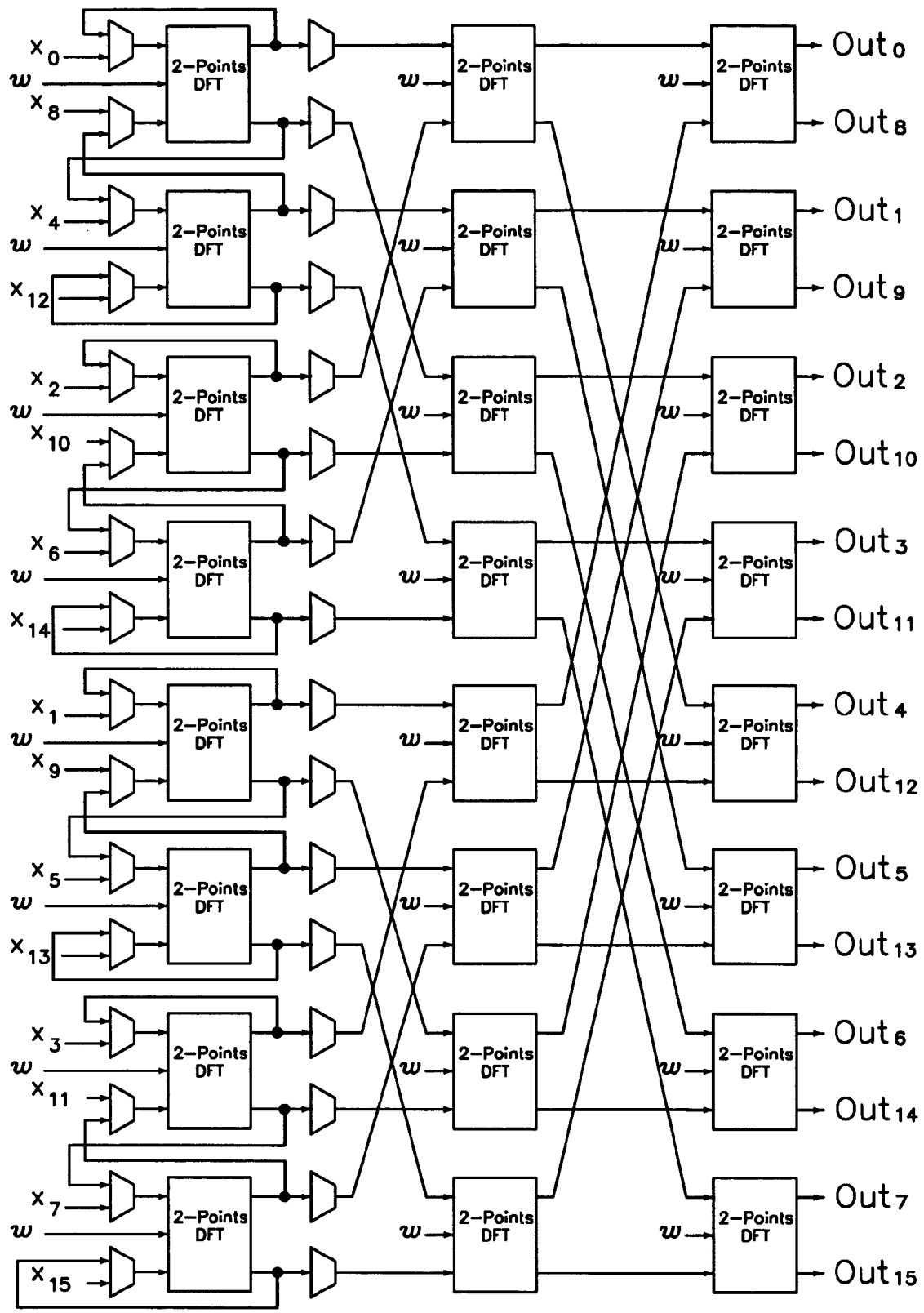
FIG. 15 is a diagram of 16 points array of column structure in accordance with the present invention.
Figure 16:
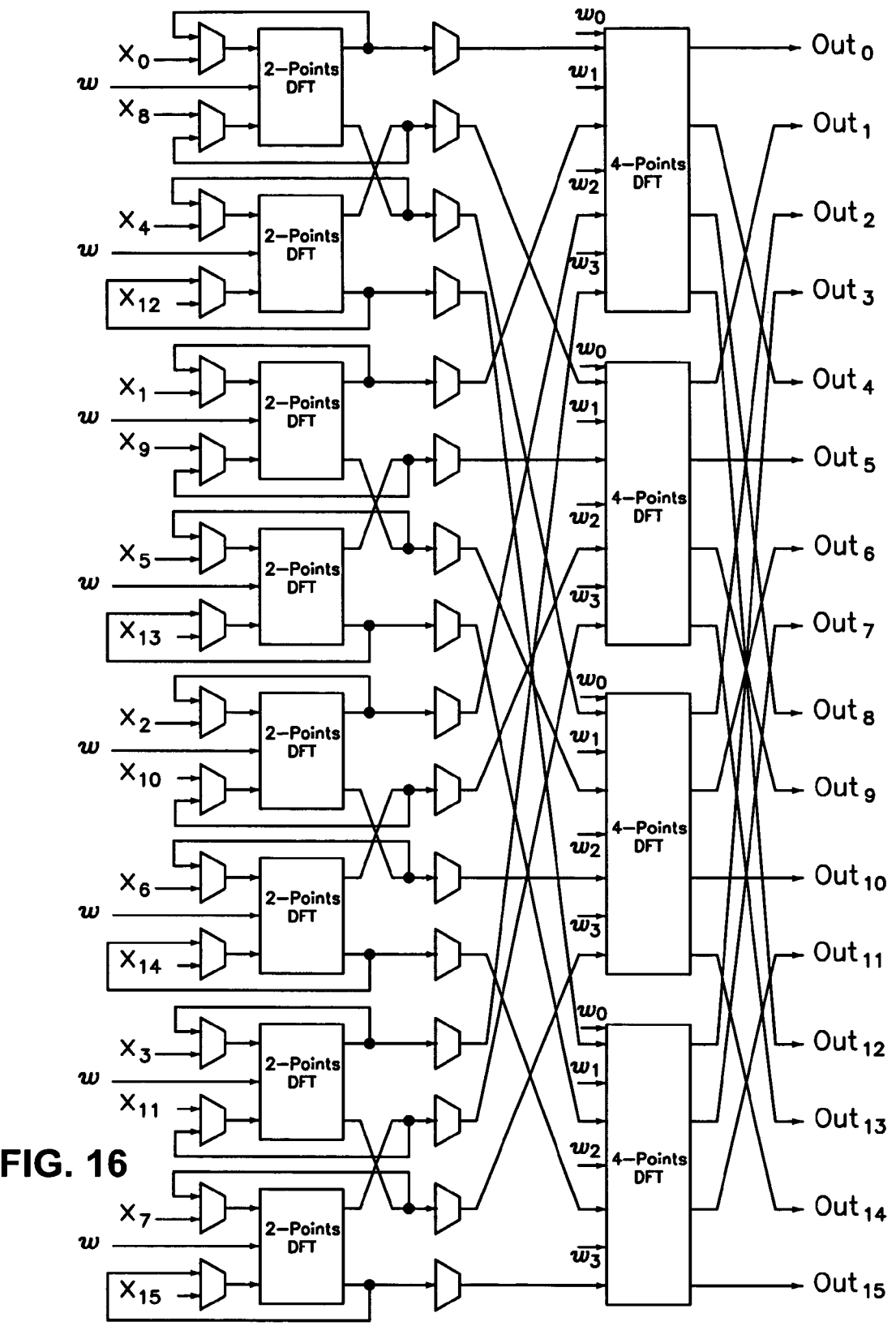
FIG. 16 is a diagram of 16-points array of column architecture in accordance with the present invention.

Further block building of these modules could be achieved by duplicating the block circuit diagram of FIG. 14 and combining them with eight radix-2 butterflies in order to obtain a transform of size 16. This combination is achieved by feeding the same labeled output of each block (for instance OUT$_0$) to the inputs of the same labeled butterfly (for example, Butterfly 0) where the same labeled output of the first block is connected to the first input of the same labeled butterfly, and the same labeled output of the second block is connected to the second input of the same labeled butterfly. Two different structures of the block building process are illustrated in FIGS. 15 and 16.

Nested Column Architecture.

Figure 17:
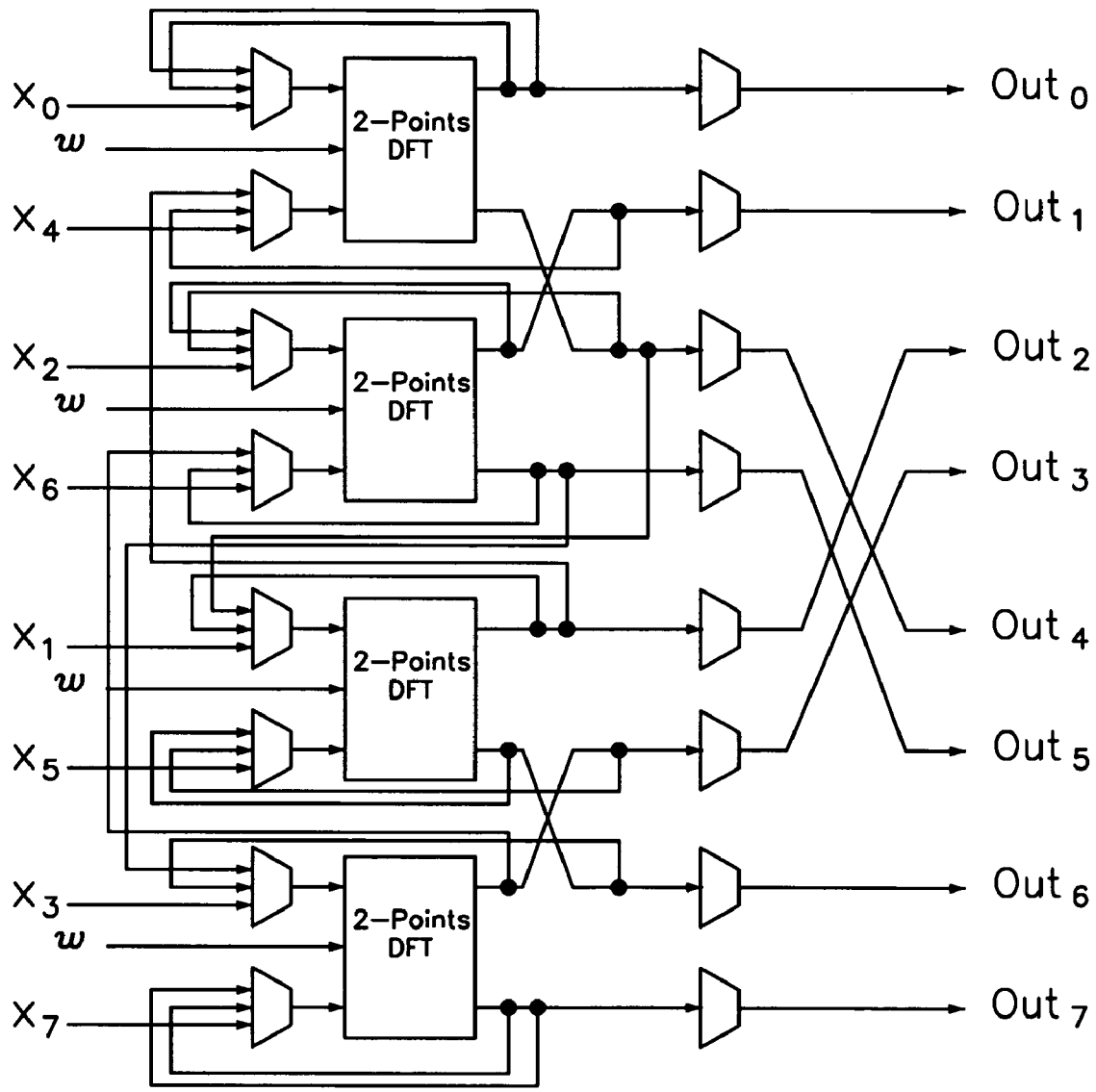
FIG. 17 is a diagram of nested column architecture in accordance with the present invention.

Further reduction in processing element butterfly implementation could be achieved with the nested column structure as shown in FIG. 17, which shows multiple-iteration radix-$r^2$ FFT in accordance with the present invention. Such architecture would be of great interest in hardware implementation since it only requires N/r butterflies for data of size N and where the switching network has been simplified. In fact, further block building of these modules could be achieved by duplicating the block circuit diagram of FIG. 17 and then combining. This combination is achieved by feeding the same labeled output of each block (for instance OUT$_0$) to the inputs of the same labeled butterfly (for example, Butterfly 0) where the same labeled output of the first block is connected to the first input of the same labeled butterfly, meanwhile the same labeled output of the second block is connected to the second input of the same labeled butterfly.

Figure 8:
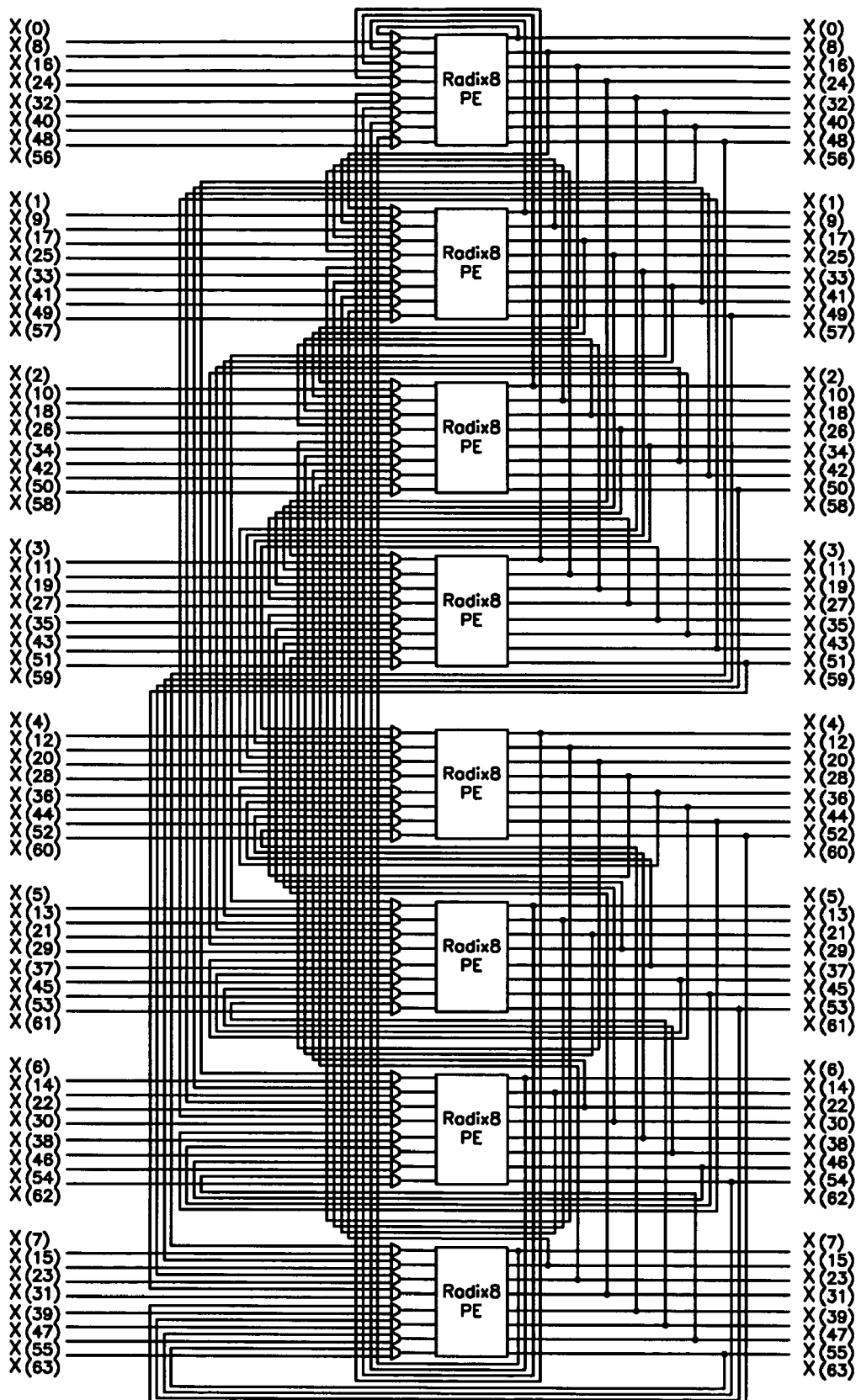
FIG. 8 is column architecture for 64-point radix-8 FFT, which is a diagram of one embodiment of a two iterations radix-8 kernel computation module in accordance with the present invention.
Figure 9:
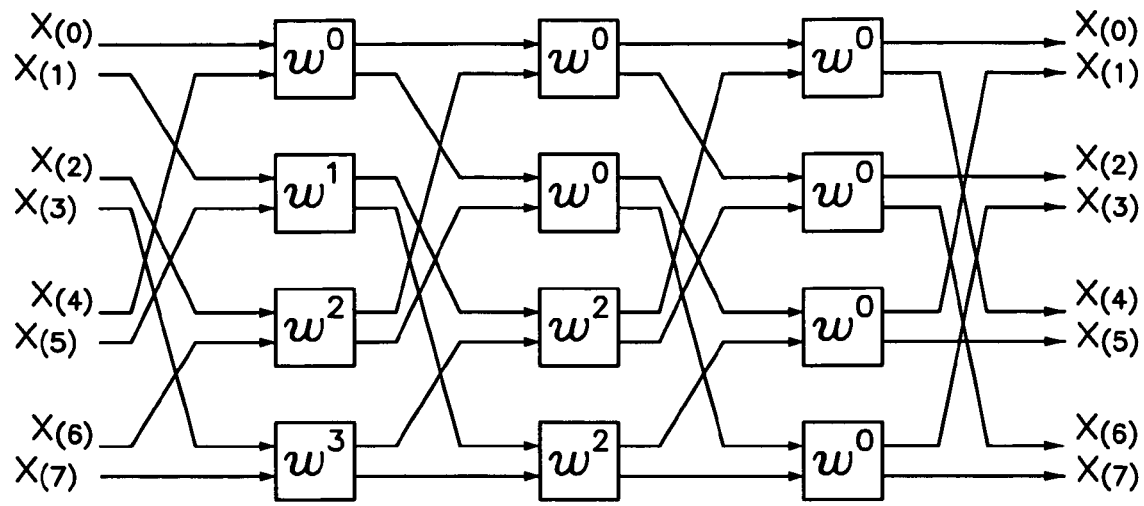
FIG. 9 is a prior art 8-point Radix-2 Constant geometry DIF FFT.
Figure 18:
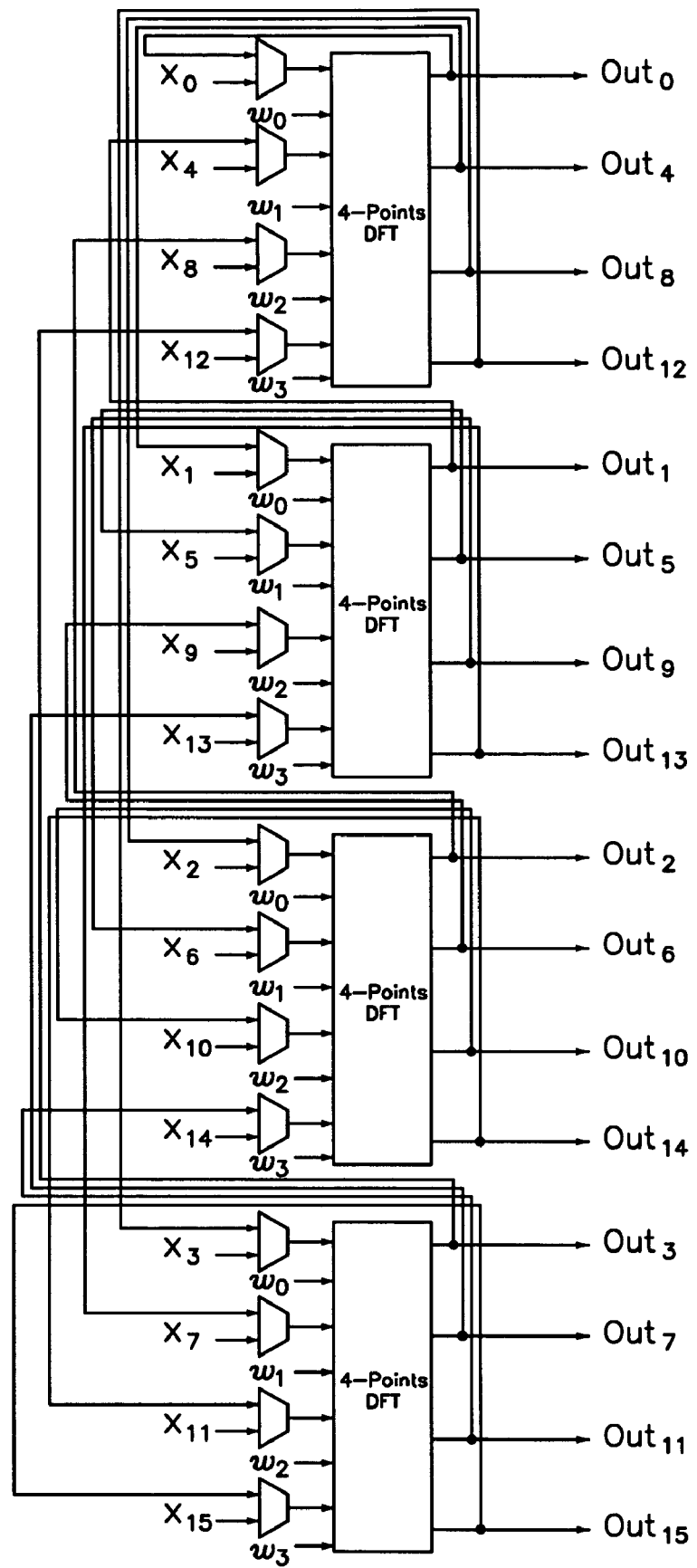
FIG. 18 is a diagram of two iterations Radix-4 kernel computation in accordance with the present invention.
Figure 21:
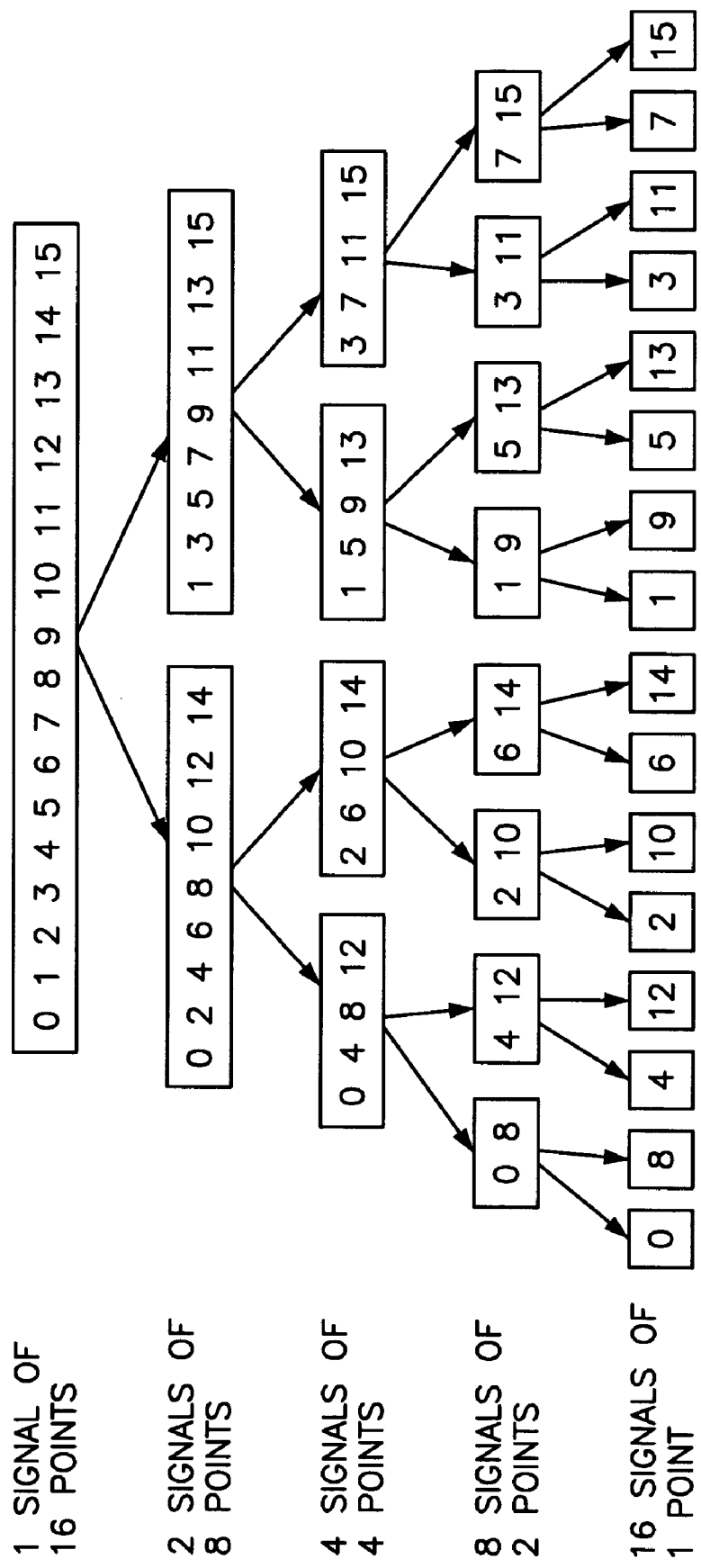
FIG. 21 shows FFT decomposition such that N point signal is decomposed into N signals each containing a single point.

Stage reduction is possible by using higher radices, for instance 16-points is obtained by the radix-4 two iterations kernel computation illustrated in FIG. 18 and the 64 points DFT is obtained by either block building process described in the radix-$r^2$ section or by mean of the radix-8 two iterations kernel computation illustrated in FIG. 8.

Data flow control is a major concern in an FFT process due to the complexity of the shuffling and permutation processes. Accordingly, the present invention presents an efficient way of controlling the output-input data between the butterflies during the FFT process and efficient structures for hard wired FFT processors.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An apparatus configured to generate output data that are Fourier transforms of input data by performing Fourier transform of the input data comprising:
   a two iteration circuit having four inputs and four corresponding outputs including:
   a first radix-2 butterfly having a two iteration butterfly processing element with first and second inputs and corresponding first and second outputs;
   a second radix-2 butterfly having a two iteration butterfly processing element with first and second inputs and corresponding first and second outputs;
   a first switch having an input defining a first input of the two iteration circuit and a feedback input;
   the first switch having an output coupled to the first input of the first radix-2 butterfly such that the two iteration circuit first input is output for a first iteration of processing and the first switch feedback input is output for a second iteration of processing by the first radix-2 butterfly;
   a second switch having an input defining a second input of the two iteration circuit and a feedback input;
   the second switch having an output coupled to the second input of the first radix-2 butterfly such that the two iteration circuit second input is output for a first iteration of processing and the second switch feedback input is output for a second iteration of processing by the first radix-2 butterfly;
   a third switch having an input defining a third input of the two iteration circuit and a feedback input;
   the third switch having an output coupled to the first input of the second radix-2 butterfly such that the two iteration circuit third input is output for a first iteration of processing and the third switch feedback input is output for a second iteration of processing by the second radix-2 butterfly;
   a fourth switch having an input defining a fourth input of the two iteration circuit and a feedback input;
   the fourth switch having an output coupled to the second input of the second radix-2 butterfly such that the two iteration circuit fourth input is output for a first iteration of processing and the fourth switch second input is output for a second iteration of processing by the second radix-2 butterfly;

the first output of the first radix-2 butterfly coupled to the feedback input of the first switch and also defining a corresponding first output to the two iteration circuit first input;

the second output of the first radix-2 butterfly coupled to the feedback input of the third switch and also defining a corresponding third output to the two iteration circuit third input;

the first output of the second radix-2 butterfly coupled to the feedback input of the second switch and also defining a corresponding second output to the two iteration circuit second input; and the second output of the second radix-2 butterfly coupled to the feedback input of the fourth switch and also defining a corresponding fourth output to the two iteration circuit fourth.

2. The apparatus of claim 1 wherein each two iteration butterfly processing element includes a plurality of multipliers configured to multiply input data and corresponding coefficients and an adder configured to sum multiplication outputs from the multipliers.

3. An apparatus comprising a plurality of two iteration circuits as defined in claim 1.

4. The apparatus of claim 3 wherein each two iteration butterfly processing element includes a plurality of multipliers configured to multiply input data and corresponding coefficients and an adder configured to sum multiplication outputs from the multipliers.

5. The apparatus of claim 3 further comprising a combination phase element configured to selectively process the two iteration circuit outputs in pairs using butterfly computing elements.

6. An apparatus comprising first and second two iteration circuits as defined in claim 1.

7. The apparatus of claim 6 wherein each two iteration butterfly processing element includes a plurality of multipliers configured to multiply input data and corresponding coefficients and an adder configured to sum multiplication outputs from the multipliers.

8. The apparatus of claim 7 wherein the first two iteration circuit inputs define first, second, third and fourth inputs of an eight point Fast Fourier transform array and the second two iteration circuit inputs define fifth, sixth, seventh and eighth inputs of the eight point Fast Fourier transform array, further comprising a combination phase element configured to selectively process the two iteration circuit outputs in pairs using butterfly computing elements to define corresponding outputs of the eight point Fast Fourier transform array.

9. The apparatus of claim 8 wherein combination phase element includes:

a first butterfly computing element having first and second inputs and corresponding first and second outputs wherein:
the first butterfly first input is coupled to the first output of the first two iteration circuit;
the first butterfly first output defines a corresponding first output to the eight point Fast Fourier transform array;
the first butterfly second input is coupled to the first output of the second two iteration circuit;
the first butterfly second output defines a corresponding fifth output to the eight point Fast Fourier transform array;

a second butterfly computing element having first and second inputs and corresponding first and second outputs wherein:
the second butterfly first input is coupled to the second output of the first two iteration circuit;
the second butterfly first output defines a corresponding second output to the eight point Fast Fourier transform array;
the second butterfly second input is coupled to the second output of the second two iteration circuit;
the second butterfly second output defines a corresponding sixth output to the eight point Fast Fourier transform array;

a third butterfly computing element having first and second inputs and corresponding first and second outputs wherein:
the third butterfly first input is coupled to the third output of the first two iteration circuit;
the third butterfly first output defines a corresponding third output to the eight point Fast Fourier transform array;
the third butterfly second input is coupled to the third output of the second two iteration circuit;
the third butterfly second output defines a corresponding seventh output to the eight point Fast Fourier transform array; and a fourth butterfly computing element having first and second inputs and corresponding first and second outputs wherein:
the fourth butterfly first input is coupled to the fourth output of the first two iteration circuit;
the fourth butterfly first output defines a corresponding fourth output to the eight point Fast Fourier transform array;
the fourth butterfly second input is coupled to the fourth output of the second two iteration circuit fourth;
the fourth butterfly second output defines a corresponding eighth output to the eight point Fast Fourier transform array.

* * * * *